United States Patent
Lee et al.

(10) Patent No.: US 12,554,121 B2
(45) Date of Patent: Feb. 17, 2026

(54) OPTICAL PATH CONTROL DEVICE AND MANUFACTURING METHOD OF THE SAME

(71) Applicant: LG Display Co., Ltd., Seoul (KR)

(72) Inventors: Sanghyun Lee, Paju-si (KR); Minsu Park, Paju-si (KR); Chiyong Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 639 days.

(21) Appl. No.: 17/961,923

(22) Filed: Oct. 7, 2022

(65) Prior Publication Data

US 2023/0213752 A1   Jul. 6, 2023

(30) Foreign Application Priority Data

Dec. 30, 2021   (KR) .................. 10-2021-0192359

(51) Int. Cl.
  *G02F 1/17* (2019.01)
  *C09J 201/00* (2006.01)
  *G02B 26/08* (2006.01)
  *G02F 1/133* (2006.01)

(52) U.S. Cl.
  CPC ............ *G02B 26/08* (2013.01); *C09J 201/00* (2013.01); *G02F 1/133* (2013.01); *C09J 2203/318* (2013.01)

(58) Field of Classification Search
  CPC ....................... G02F 1/167; G02F 1/16757
  See application file for complete search history.

(56) References Cited

U.S. PATENT DOCUMENTS

2023/0280612 A1* 9/2023 Choi .................. G02F 1/1323
349/62

FOREIGN PATENT DOCUMENTS

| CN | 102338962 A   | 2/2012  |
|----|---------------|---------|
| CN | 112585520 A   | 3/2021  |
| JP | 2004-144793 A | 5/2004  |
| JP | 2013-37190 A  | 2/2013  |
| KR | 10-2009-0073466 A | 7/2009 |
| KR | 10-2021-0042627 A | 4/2021 |
| KR | 10-2021-0043155 A | 4/2021 |
| KR | 10-2021-0089873 A | 7/2021 |
| KR | 10-2021-0136603 A | 11/2021 |

* cited by examiner

*Primary Examiner* — Joseph P Martinez
(74) *Attorney, Agent, or Firm* — Birch, Stewart, Kolasch & Birch, LLP

(57) ABSTRACT

An optical path control device can include a first substrate having a first electrode disposed thereon, a second substrate disposed on the first substrate and having a second electrode disposed thereon, and a light conversion layer disposed between the first substrate and the second substrate and including a partition portion and a containing portion including suspended particles, where the partition portion and the containing portion are alternately disposed. The optical path control device can further include an adhesive layer disposed between the first substrate and the light conversion layer, a sealing portion disposed between the first substrate and the second substrate and surrounding the light conversion layer, and a dam portion disposed between the first substrate and the second substrate and disposed on an outside of the sealing portion.

9 Claims, 28 Drawing Sheets

OPTICAL PATH CONTROL DEVICE AND MANUFACTURING METHOD OF THE SAME

CROSS REFERENCE TO RELATED APPLICATION

The present application claims priority to Korean Patent Application No. 10-2021-0192359, filed in the Republic of Korea on Dec. 30, 2021, the entire contents of which are hereby expressly incorporated by reference into the present application.

BACKGROUND

Field

The present invention relates to an optical path control device and a manufacturing method of the same

Description of the Related Art

A light-shielding film can function as an optical path control device that blocks light in a specific direction and passes light in another specific direction therethrough by controlling a moving path of light based on an incidence angle of external light. The light-shielding film can be attached to a display device such as a cellular phone, a laptop computer, a tablet personal computer (PC), a vehicle navigation system, etc., to adjust a wide viewing angle when an image is output or to implement a clear display quality within a specific viewing angle.

Recently, a switchable light-shielding film capable of turning on/off a viewing angle control mode according to a user environment has been developed. The switchable light-shielding film can block or open an optical path through dispersion and agglomeration of particles by controlling electrical behavior particles dispersed in a solvent according to an electric field formed therein. By using the switchable light-shielding film, a private mode and a share mode of the display device can be implemented.

Such a switchable light-shielding film can include an adhesive layer for bonding between a light conversion layer including the electrical behavior particles and an electrode for forming an electric field in the electrical behavior particles. In general, the adhesive layer can be vulnerable to penetration of external substances such as moisture, and thus there is a concern that the solvent can be contaminated or volatilized due to impurities introduced through the adhesive layer.

SUMMARY OF THE DISCLOSURE

Embodiments of the present invention provide an optical path control device that shields an adhesive layer from the outside through a sealing portion, and a manufacturing method of the same.

Further, the optical path control device further shields the adhesive layer from the outside through a dam portion.

In addition, embodiments of the present invention provide an optical path control device that prevents an injection hole from being blocked by the adhesive layer by forming an opening formed in the adhesive layer around the injection hole to be further recessed in the direction of an inside wall of the injection hole, and a manufacturing of the same.

An optical path control device according to an embodiment of the present invention can include a first substrate having a first electrode formed thereon, a second substrate disposed on the first substrate and having a second electrode formed thereon, a light conversion layer disposed between the first substrate and the second substrate and including a partition portion and a containing portion including suspended particles, the partition portion and the containing portion being alternately disposed, an adhesive layer disposed between the first substrate and the light conversion layer, and a sealing portion disposed between the first substrate and the second substrate and surrounding the light conversion layer. The sealing portion can be formed to fill a first injection hole formed in the first substrate and the adhesive layer.

The optical path control device further includes a dam portion disposed between the first substrate and the second substrate and disposed on an outside of the sealing portion.

The first injection hole includes a first opening formed in the first substrate and a second opening formed in the adhesive layer to overlap the first opening, and the sealing portion can be formed to fill the first opening and the second opening.

The sealing portion can include a protrusion that protrudes downward at the first injection hole and covers a lower surface of the first substrate around the first injection hole.

The protrusion can have an anchor shape. The adhesive layer can be shielded from an outside by the first substrate and the sealing portion. The second opening can be formed to have a larger width than the first opening.

The dam portion can be formed to fill a second injection hole formed in the first substrate and the adhesive layer. The first injection hole can communicate with the containing portion.

A manufacturing method of an optical path control device according to an embodiment of the present invention can include forming an adhesive layer having a second opening on a first substrate having a first electrode formed thereon; bonding a second substrate having a second electrode formed thereon to the first substrate with a light conversion layer interposed therebetween, the light conversion layer having a partition portion and a containing portion disposed alternately, forming a first injection hole including a first opening and the second opening by forming the first opening in a partial area of the first substrate overlapping the second opening, injecting a dispersing liquid including suspended particles into the containing portion communicating with the first injection hole through the first injection hole, and forming a sealing portion by injecting a sealant to fill the first injection hole.

The second opening can extend continuously along an edge of the adhesive layer, and the first opening can extend along an upper side edge and a lower side edge of the first substrate.

The sealant can be further injected to an outside of the first injection hole, and the sealing portion can include a protrusion that protrudes downward at the first injection hole and covers a lower surface of the first substrate around the first injection hole.

The protrusion can have an anchor shape. The first opening can be formed to have a smaller width than the second opening.

The method can further include, after the forming of the first injection hole, forming a second injection hole penetrating the first substrate and the adhesive layer at the outside of the first injection hole. The second injection hole can extend along the upper side edge and the lower side edge.

The method can further include forming a dam portion by injecting a solvent to fill the second injection hole.

The method can further include further forming the first injection hole by further forming the first opening in a remaining area of the first substrate overlapping the second opening, and further forming the sealing portion by injecting the sealant to fill the first injection hole.

The method can further include cutting the first substrate and the second substrate outside the sealing portion and the dam portion.

An optical path control device according to another embodiment of the present invention can include a first substrate having a first electrode formed thereon; a second substrate disposed on the first substrate and having a second electrode formed thereon; a light conversion layer disposed between the first substrate and the second substrate and comprising a partition portion and a containing portion including suspended particles, the partition portion and the containing portion being alternately disposed; an adhesive layer disposed between the first substrate and the light conversion layer; a primer disposed between the light conversion layer and the second substrate, and a sealing portion disposed between the first substrate and the second substrate and surrounding the light conversion layer, wherein the sealing portion is formed to fill a first injection hole formed in the second substrate and the primer.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE EMBODIMENTS

Figure 1:
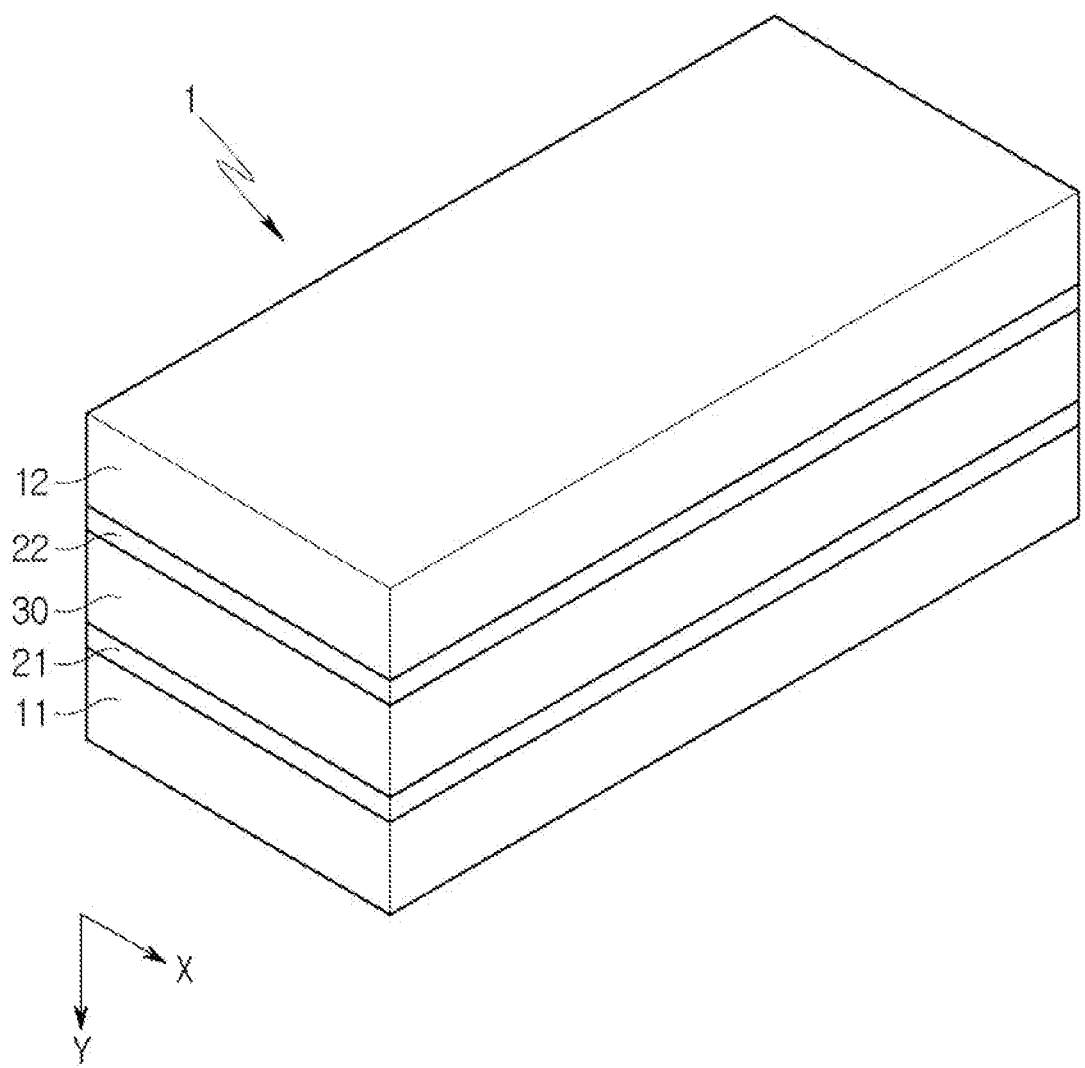
FIG. 1 is a schematic perspective view of an optical path control device according to an exemplary embodiment of the present invention.

Hereinafter, embodiments of the present disclosure will be described with reference to drawings. In this specification, when a component (or region, layer, part, etc.) is referred to as being "on", "connected" to, or "joined" to other component, it means that the component can be directly connected/coupled to the other component or a third component can be arranged between them.

The same reference numbers refer to the same components. In addition, in the drawings, the thickness, ratio, and dimension of the components are exaggerated for effective description of technical contents. An "and/or" includes one or more combinations capable of being defined by the associated configurations.

Terms such as "first" and "second" can be used to describe various components, but the components are not limited by the terms. The terms are used only for the purpose of distinguishing one component from other components. For example, the first component can be referred to as the second component without departing from a scope of right of the present embodiments, and similarly, the second component can also be referred to as the first component. Singular expressions include plural expressions unless the context clearly indicates otherwise.

Terms such as "below", "lower", "above", "upper", etc. are used to describe the association of components shown in the figures. The terms are relative concepts and are explained based on the directions indicated in the drawings.

It should be understood that terms such as "comprise" or "have", etc. are intended to indicate that a feature, number, step, operation, component, part, or combination thereof is described in the specification, and that the possibility of the presence or addition of one or more of other features or numbers, steps, operations, components, parts, or these combinations thereof is not excluded in advance.

Figure 2:
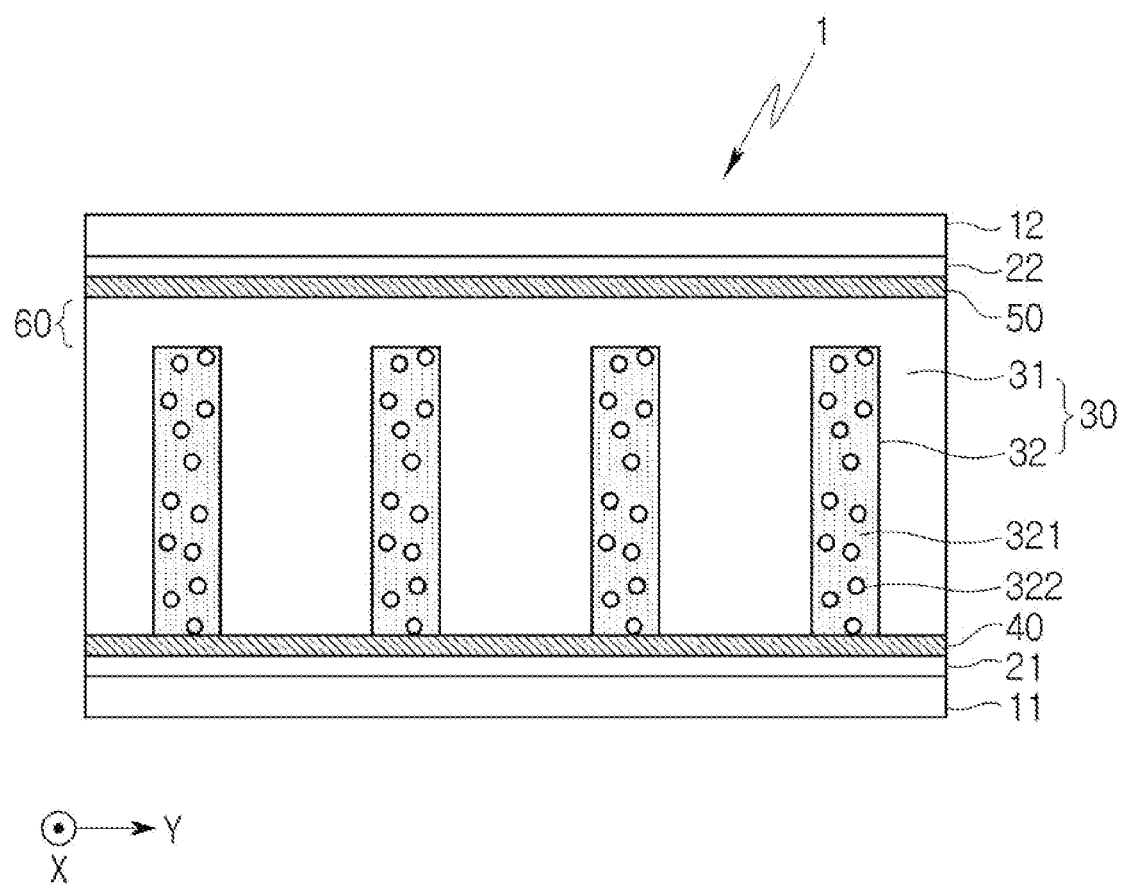
FIG. 2 is a schematic cross-sectional view illustrating an optical path control device in a private mode.
Figure 3:
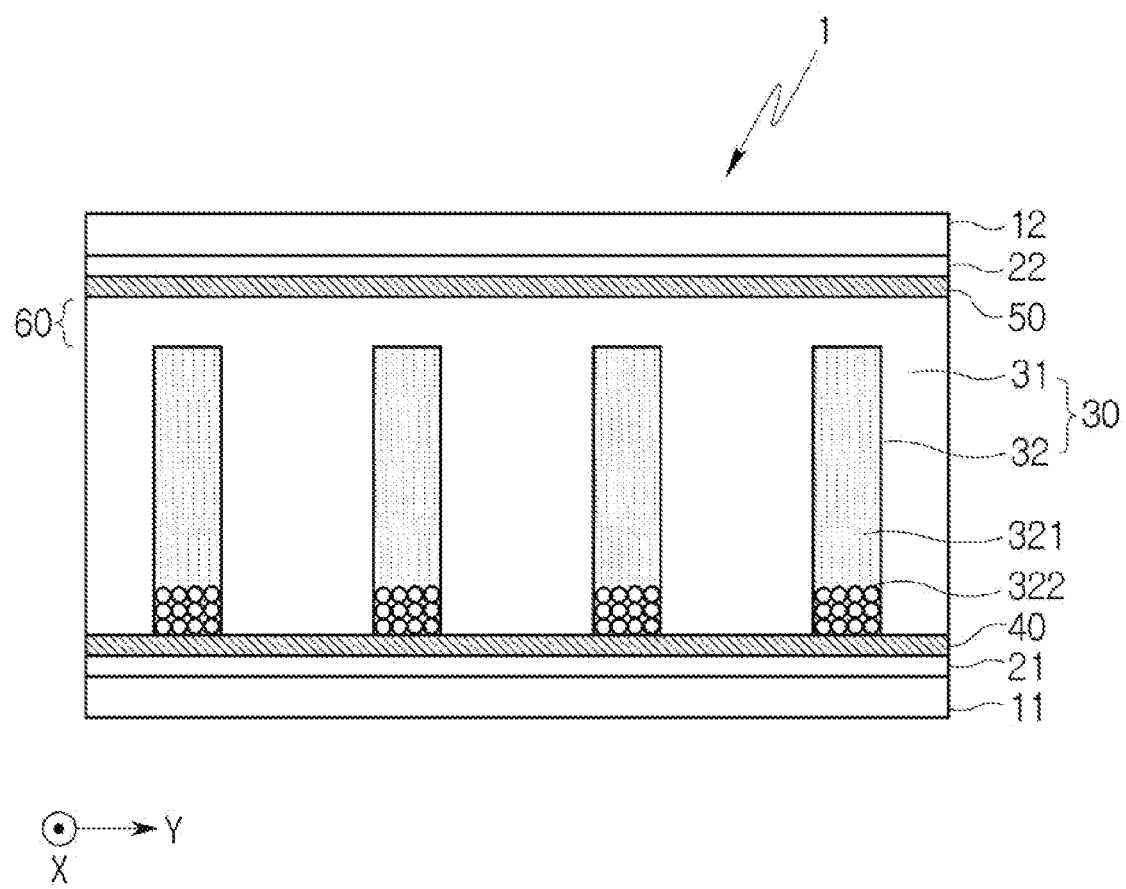
FIG. 3 is a schematic cross-sectional view illustrating an optical path control device in a share mode.

FIG. 1 is a schematic perspective view of an optical path control device according to an exemplary embodiment. FIG. 2 is a schematic cross-sectional view illustrating an optical path control device in a private mode. FIG. 3 is a schematic cross-sectional view illustrating an optical path control device in a share mode. More specifically, FIGS. 2 and 3 are cross-sectional views of the optical path control device cut along a second direction Y.

Referring to FIGS. 1 to 3, an optical path control device 1 can include a first substrate 11, second substrate 12, a first electrode 21, a second electrode 22, and a light conversion layer 30.

The first substrate 11, which is a base material of the optical path control device 1, can be a light-transmitting substrate. The first substrate 11 can be a rigid substrate including glass or reinforced glass or a flexible substrate of a plastic material. For example, the first substrate 11, which is a flexible high-polymer film, can include any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), a triacetylcellulose (TAC) film, a polyvinyl alcohol (PVA) film, polyimide (PI), and polystyrene (PS). However, the material of the first substrate 11 is not limited thereto.

The first electrode 21 can be disposed on a surface (for example, an upper surface) of the first substrate 11. The first electrode 21 can be interposed between the first substrate 11 and the second substrate 12 described below. The first electrode 21 can be disposed in a surface electrode or pattern electrode form on the first substrate 11.

The first electrode 21 can include a transparent conductive material. For example, the first electrode 21 can be formed of indium tin oxide (ITO), indium zinc oxide (IZO), copper oxide, tin oxide, zinc oxide (ZnO), titanium oxide, etc. In an embodiment, a light transmittance of the first electrode 21 can be greater than or equal to about 80%. Then, the first electrode 21 is invisible from the outside, and the light transmittance thereof can increase such that a luminance of the display device including the optical path control device 1 can be improved.

In another embodiment, the first electrode 21 can include various metals to implement low resistance. For example, the first electrode 21 can include at least one metal among chrome (Cr), nickel (Ni), copper (Cu), aluminum (Al), silver (Ag), molybdenum (Mo), gold (Au), titanium (Ti), and an alloy thereof.

The second substrate 12 can be disposed on the first substrate 11. The second substrate 12, which is a light-transmitting substrate, can include a material that is the same as or similar to that of the first substrate 11.

The second electrode 22 can be disposed on one surface (for example, a lower surface) of the second substrate 12. The second electrode 22 can be interposed between the first substrate 11 and the second substrate 12. The second electrode 22 can be disposed in the form of a surface electrode or a pattern electrode on the lower surface of the second substrate 12.

The second electrode 22 can include a transparent conductive material and various metals for implementing a low resistance. The second substrate 22 can include a material that is the same as or similar to that of the first substrate 21.

The second electrode 22 can be disposed to at least partially or entirely overlap or at least to be adjacent to the first electrode 21. Thus, when a voltage is applied to the first electrode 21 and the second electrode 22, an electric field can be formed therebetween.

The light conversion layer 30 can be interposed between the first substrate 11 and the second substrate 12. The light conversion layer 30 can include a partition portion 31 and a containing portion 32. More specifically, the light conversion layer 30 can include the containing portion 32 partitioned into a plurality of areas by the partition portion 31.

In the light conversion layer 30, the containing portion 32 can extend long in a first direction X. The partition portion 31 and the containing portion 32 in the light conversion layer 30 can be disposed alternately in a second direction Y. Here, the partition portion 31 and the containing portion 32 can have widths that are the same as or different from each other with respect to the second direction Y.

The partition portion 31 can include a transparent light-transmitting material. For example, the partition portion 31 can include ultra-violet (UV) resin or photoresist resin as photo-curable resin, or can include urethane resin, acryl resin, etc. The partition portion 31 can pass light incident to the first substrate 11 or the second substrate 12 therethrough in an opposite direction.

The containing portion 32 can have upper and lower widths that are the same as or different from each other. In an embodiment, the containing portion 32 can be formed such that the lower width adjacent to the first substrate 11 is greater than the upper width adjacent to the second substrate 12. However, the present embodiment is not limited thereto.

The containing portion 32 can be formed to be spaced apart from a primer 50 to be described below by a predetermined distance. An upper portion of the partition portion 31 to which the containing portion 32 is not formed and to which the primer 50 is attached can form a base portion 60 of the light conversion layer 30.

The containing portion 32 can be disposed to be overlapped the first electrode 21 in at least one area thereof. Also, the containing portion 32 can be disposed to overlap the second electrode 22 in at least one area thereof.

The containing portion 32 can include a dispersing liquid 321 and suspended particles 322 dispersed in the dispersing liquid 321. The dispersing liquid 321 is filled in the containing portion 32, and the suspended particles 322 can be dispersed in the dispersing liquid 321.

The dispersing liquid 321, which is a solvent where the suspended particles 322 are dispersed, can be a transparent and low-viscosity insulating solvent. For example, the dispersing liquid 321 can include at least one material among halocarbon-based oil, paraffin-based oil, and isopropyl alcohol.

The suspended particles 322 can be colored electrical behavior particles, for example, black particles. The suspended particles 322 can be, but not limited to, carbon black particles. The containing portion 32 can be electrically connected to the first electrode 21 and the second electrode 22, and the charged suspended particles 322 can be controlled in terms of an arrangement state thereof according to a voltage difference between the first electrode 21 and the second electrode 22. The light conversion layer 30 can implement a light-transmitting mode and a light-blocking mode according to an arrangement state of the suspended particles 322.

More specifically, when a voltage is not applied to the first electrode 21 and the second electrode 22, the suspended particles 322 can be uniformly dispersed in the dispersing liquid 321 as shown in FIG. 2, thereby implementing the light-blocking mode where transmission of external light is blocked. In this case, the external light applied to the partition portion 31 can pass through the light conversion layer 30, such that the external light is visible from the front of the optical path control device 1. For example, the optical path control device 1 can implement a private mode in which a view is opened for a specific viewing angle (for example, a front viewing angle) and the view is blocked for another viewing angle (for example, a side viewing angle).

When a voltage is applied to at least one of the first electrode 21 and the second electrode 22, as shown in FIG. 3, the suspended particles 322 can move toward the first electrode 21 or the second electrode 22 by an electric field as shown in FIG. 3. Here, the moving direction of the suspended particles 322 can be controlled according to the polarity (a negative or positive polarity) of the suspended particles 322 and a relative magnitude of the voltage applied to the first electrode 21 and the second electrode 22.

When the suspended particles 322 are agglomerated around the first electrode 21 or the second electrode 22, the external light can pass through the partition portion 31 and the containing portion 32, thus implementing a light-transmitting mode. For example, the optical path control device 1 can implement a share mode where a view is opened for both the front and the side.

An adhesive layer 40 can be further disposed between the light conversion layer 30 and the first electrode 21. The adhesive layer 40 is formed on the first electrode 21 to improve a coating property and an adhesive property, and can be, for example, a transparent adhesive such as an optical clear adhesive (OCA) or an optical curable resin (OCR).

The primer 50 can be further disposed between the light conversion layer 30 and the second electrode 22. Specifically, the primer 50 is disposed between the base portion 60 of the light conversion layer 30 and the second electrode 22.

The primer 50 is a conductive primer, and can be provided to improve adhesion between the light conversion layer 30 and the second electrode 22. The primer 50 can include curable resin cured by energy such as heat, ultraviolet rays, electron rays, etc. The curable resin can be, for example, but not limited to, silicon resin, acryl resin, metacryl resin, epoxy resin, melamine resin, polyester resin, urethane resin, etc.

Figure 4:
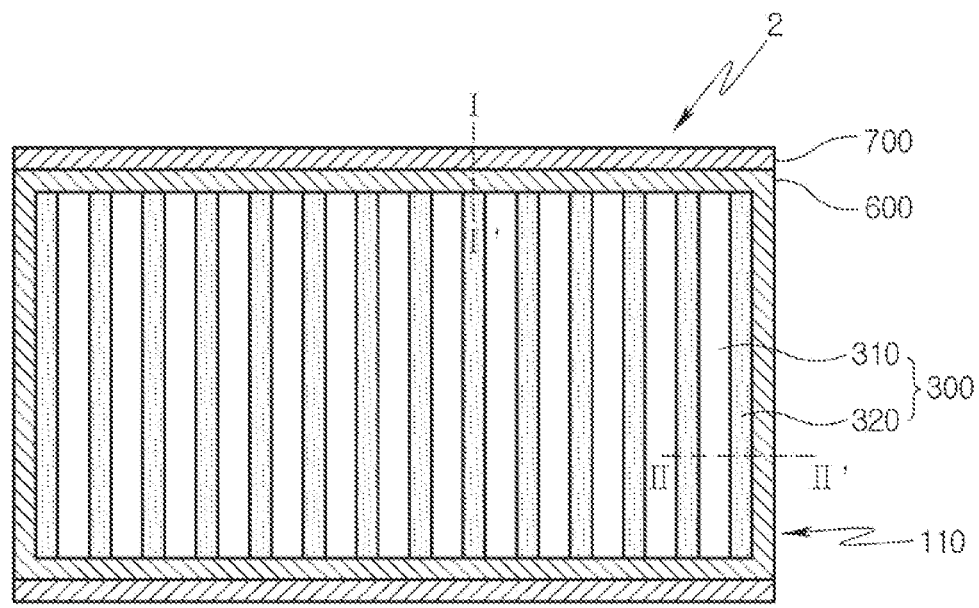
FIG. 4 is a schematic plan view of an optical path control device according to an exemplary embodiment of the present invention.

FIG. 4 is a schematic plan view of an optical path control device according to an exemplary embodiment.

Referring to FIG. 4, the optical path control device 2 can include a first substrate 110 and a light conversion layer 300.

The first substrate 110 is a base substrate of the optical path control device 2 and can have a generally rectangular shape. However, the shape of the first substrate 110 is not limited thereto, and can follow the shape of a product to which the optical path control device 2 is applied. For example, the first substrate 110 can have various shapes such as a circular shape, an oval shape, a polygonal shape, etc.

The light conversion layer 300 can include a partition portion 310 and a containing portion 320. In the light conversion layer 300, the partition portion 310 and the containing portion 320 can extend long in a first direction X and can be disposed alternately in a second direction Y.

Although schematically illustrated, the containing portion 320 can include the dispersing liquid 321 and the suspended particles 322 dispersed in the dispersing liquid 321 as described with reference to FIGS. 2 and 3. The suspended particles 322 can be colored electrical behavior particles, and for example can be black particles. The suspended particles 322 can be controlled in terms of an arrangement state thereof according to an electric field formed in the optical path control device 2, thereby implementing the light-transmitting mode and the light-blocking mode of the light conversion layer 300.

A sealing portion 600 can be disposed in an edge area of the optical path control device 2. The sealing portion 600 is disposed along the edge of the first substrate 110 and can surround the light conversion layer 300 on a plan view.

The sealing portion 600 can be continuously disposed along a circumference of the first substrate 110. In an embodiment, the sealing portion 600 can have a rectangular frame shape continuously extending along the circumference of the first substrate 100 on a plan view. However, the present embodiment is not limited thereto.

The sealing portion 600 is provided to shield the light conversion layer 300 from the outside. For example, the sealing portion 600 prevents external foreign substances such as moisture from penetrating into the light conversion layer 300 and prevents the dispersing liquid 321 of the light conversion layer 300 from volatilizing to the outside.

A dam portion 700 can be further disposed in an edge area of the optical path control device 2. The dam portion 700 is disposed along an edge of the first substrate 110, and can be disposed on an outside of the sealing portion 600 on a plan view.

The dam portion 700 can be disposed along at least a portion of the circumference of the first substrate 110. In an embodiment, the dam portion 700 can have a bar shape extending along upper side and lower side edges of the first substrate 100. However, the present embodiment is not limited thereto.

Hereinafter, a stacked structure of the optical path control device 2 will be described in more detail.

Figure 5:
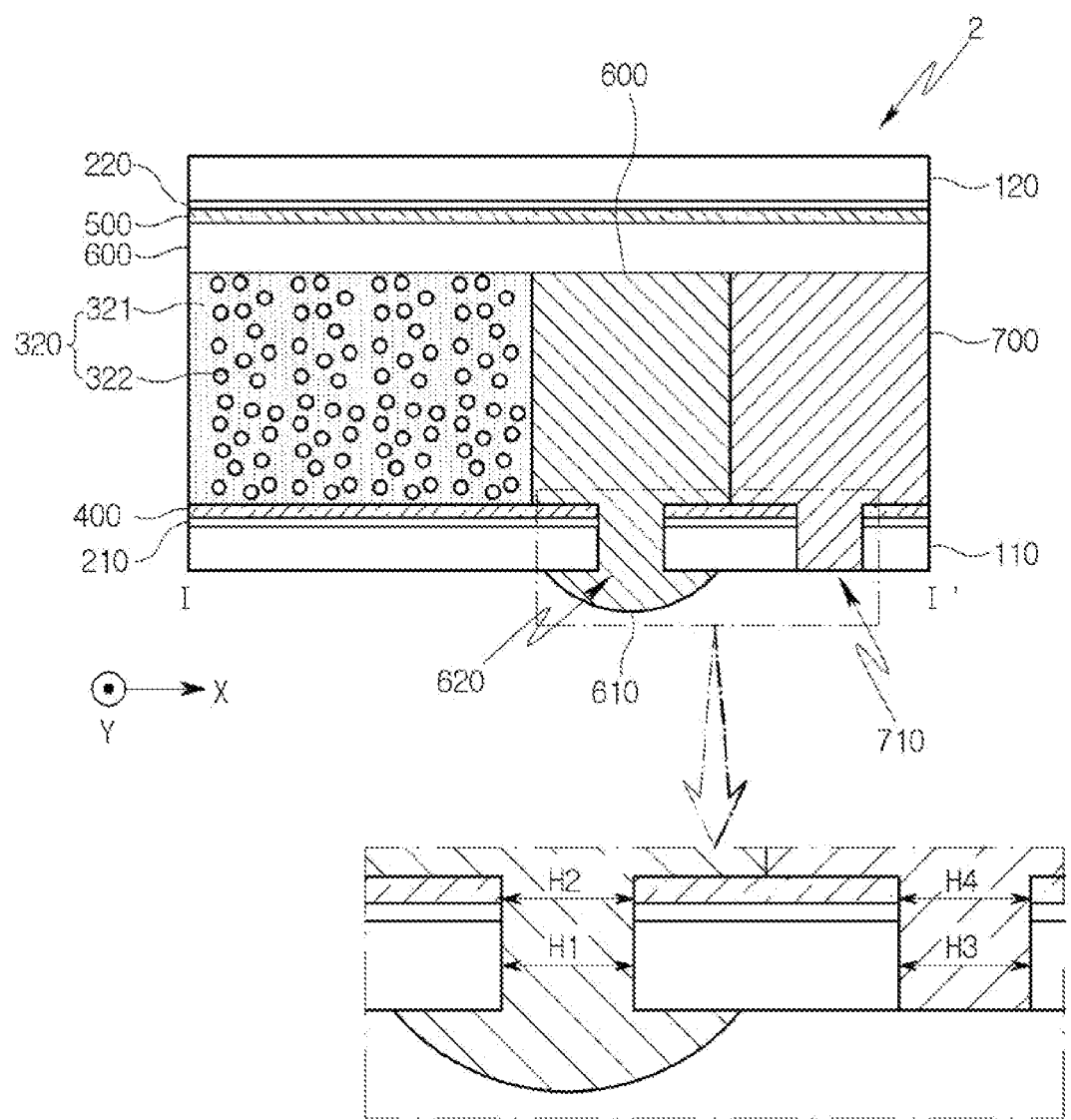
FIGS. 5 and 6 are schematic cross-sectional views of an optical path control device according to a first embodiment of the present invention.
Figure 6:
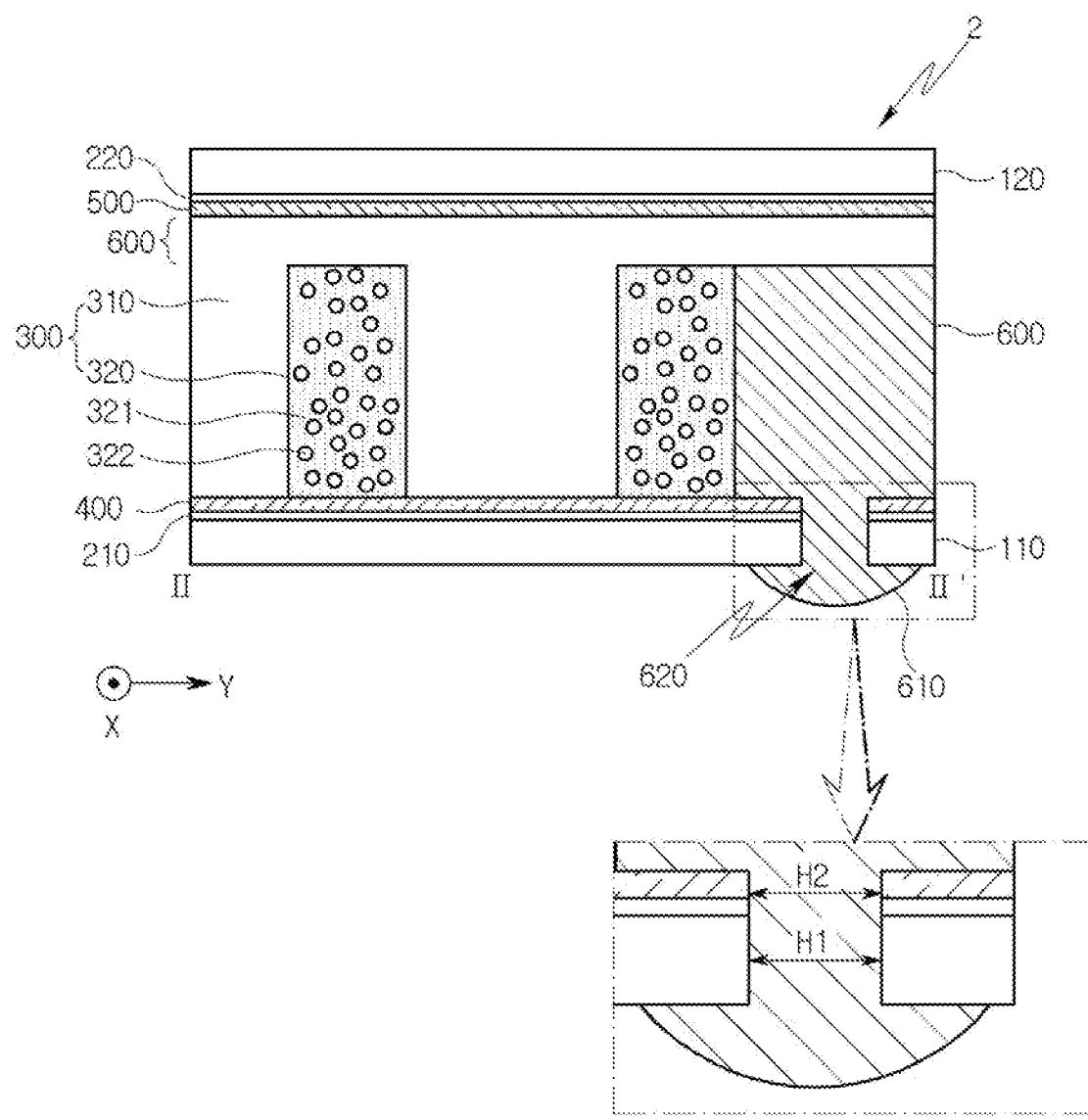

FIGS. 5 and 6 are schematic cross-sectional views of an optical path control device according to a first embodiment. Specifically, FIG. 5 is a cross-sectional view taken along line I-I' of FIG. 4, and FIG. 6 is a cross-sectional view taken along line II-II' of FIG. 4.

Referring to FIGS. 5 and 6, the optical path control device 2 can include the first substrate 110, a second substrate 120, a first electrode 210, a second electrode 220, and the light conversion layer 300.

The first substrate 110, which is a base material of the optical path control device 2, can be a light-transmitting substrate. The first substrate 110 can be a rigid substrate including glass or reinforced glass or a flexible substrate of a plastic material. For example, the first substrate 110, which is a flexible high-polymer film, can include any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), a triacetylcellulose (TAC) film, a polyvinyl alcohol (PVA) film, polyimide (PI), and polystyrene (PS).

The first electrode 210 can be disposed on a surface (for example, an upper surface) of the first substrate 110. The first electrode 210 can be interposed between the first substrate 110 and the second substrate 120 described below. The first electrode 210 can be disposed in a surface electrode or pattern electrode form on the first substrate 110.

The second substrate 120 can be disposed on the first substrate 110. The second substrate 120, which is a light-transmitting substrate, can include a material that is the same as or similar to that of the first substrate 110.

The second electrode 220 can be disposed on one surface (for example, a lower surface) of the second substrate 120. The second electrode 220 can be interposed between the first substrate 110 and the second substrate 120. The second electrode 220 can be disposed in the form of a surface electrode or a pattern electrode on a bottom surface of the second substrate 120.

The light conversion layer 300 can be interposed between the first substrate 110 and the second substrate 120. The light conversion layer 300 can include the partition portion 310 and the containing portion 320. More specifically, the light conversion layer 300 can include the containing portion 320 partitioned into a plurality of areas by the partition portion 310.

In the light conversion layer 300, the containing portion 320 can extend long in the first direction X. The partition portion 310 and the containing portion 320 in the light conversion layer 300 can be disposed alternately in the second direction Y. In this case, the partition portion 310 and the containing portion 320 can have widths that are the same as or different from each other in the second direction Y.

The partition portion 310 can include a transparent light-transmitting material. For example, the partition portion 310 can include ultra-violet (UV) resin or photoresist resin as photo-curable resin, or can include urethane resin, acryl resin, etc. The partition portion 310 can pass light incident to the first substrate 110 or the second substrate 120 therethrough in an opposite direction.

The containing portion 320 can be formed to be spaced apart from a primer 500 by a predetermined distance. An upper portion of the partition portion 310 to which the containing portion 320 is not formed and to which the primer 500 is attached can form a base portion 600 of the light conversion layer 300.

The containing portion 320 can include the dispersing liquid 321 and suspended particles 322 dispersed in the dispersing liquid 321. The dispersing liquid 321 is filled in the containing portion 320, and the suspended particles 322 can be dispersed in the dispersing liquid 321.

The dispersing liquid 321, which is a solvent where the suspended particles 322 are dispersed, can be a transparent and low-viscosity insulating solvent. For example, the dispersing liquid 321 can include at least one material among halocarbon-based oil, paraffin-based oil, and isopropyl alcohol.

The suspended particles 322 can be colored electrical behavior particles, for example, black particles. The suspended particles 322 can be, but not limited to, carbon black particles. The containing portion 320 can be electrically connected to the first electrode 210 and the second electrode 220, and the charged suspended particles 322 can be controlled in terms of an arrangement state thereof according to a voltage difference between the first electrode 210 and the second electrode 220. The light conversion layer 300 can implement a light-transmitting mode and a light-blocking mode according to an arrangement state of the suspended particles 322.

An adhesive layer 400 can be further disposed between the light conversion layer 300 and the first electrode 210. The adhesive layer 400 is formed on the first electrode 210 to improve a coating property and an adhesive property, and can be, for example, a transparent adhesive such as an optical clear adhesive (OCA) or an optical curable resin (OCR).

The primer 500 can be further disposed between the light conversion layer 300 and the second electrode 220. Specifically, the primer 500 is disposed between the base portion 600 of the light conversion layer 300 and the second electrode 220.

The primer 500 is a conductive primer, and can be provided to improve adhesion between the light conversion layer 300 and the second electrode 220. The primer 500 can include curable resin cured by energy such as heat, ultraviolet rays, electron rays, etc. The curable resin can be, for example, but not limited to, silicon resin, acryl resin, metacryl resin, epoxy resin, melamine resin, polyester resin, urethane resin, etc.

The sealing portion 600 can be disposed in an edge area of the first substrate 110. The sealing portion 600 can be interposed between the first substrate 110 and the second substrate 120. More specifically, the sealing portion 600 can be interposed between the adhesive layer 400 and the primer 500. The sealing portion 600 can be made of a silicon-based organic material or an epoxy-based organic material, for example, an epoxy-based resin. However, the present embodiment is not limited thereto.

In an embodiment, the sealing portion 600 can be formed in such a manner that a sealant is injected between the first substrate 110 and the second substrate 120 through a single process and then cured. In this embodiment, a first injection hole 620 for injecting the sealant can be formed in the first substrate 110 and the adhesive layer 400. The first injection hole 620 can include a first opening H1 formed in the first substrate 110 and a second opening H2 overlapping the first opening H1 and formed in the adhesive layer 400.

In an embodiment, the sealant can be injected to fill the first injection hole 620. Accordingly, after the sealant is cured, the sealing portion 600 can be formed to fill the first opening H1 and the second opening H2. Since the sealing portion 600 completely fills the first injection hole 620, the light conversion layer 300 and the adhesive layer 400 interposed therein can be shielded from the outside through the sealing portion 600.

In one embodiment, the sealing portion 600 can include a protrusion 610 protruding downward at the first injection hole 620 and covering a lower surface of the first substrate 110 around the first injection hole 620. As illustrated, the protrusion 610 can have an anchor shape having a thickness varying depending on a position, but the present embodiment is not limited thereto.

Through the protrusion 610, the sealing portion 600 is in contact with the first substrate 110 in a larger area. i.e., not only with the inner surface of the first opening H1 formed in the first substrate 110, but also with the lower surface of the first substrate 110. Adhesion between the first substrate 110 and the sealing portion 600 can be further improved through the protrusion 610. In addition, the light conversion layer 300 and the adhesive layer 400 interposed therein can be further shielded from the outside.

In general, the adhesive layer 400 is made of a material that is vulnerable to penetration of foreign substances, and the sealant is made of a material that is relatively resistant to external penetration. In the above structure, the adhesive layer 400 is completely blocked from the outside by the sealing portion 600. In particular, since the second opening H2 formed in the adhesive layer 400 is completely filled by the sealing portion 600, the movement path of the foreign material reaching the light conversion layer 300 through the adhesive layer 400 from a lateral surface of the edge of the optical path control device 2 can be completely blocked.

The dam portion 700 can be further disposed in the edge area of the first substrate 110.

The dam portion 700 can be interposed between the first substrate 110 and the second substrate 120. More specifically, the dam portion 700 can be interposed between the adhesive layer 400 and the primer 500. The dam portion 700 can be made of, for example, an inorganic material such as silicon oxide or silicon nitride, or an organic material such as polyimide. However, the present embodiment is not limited thereto.

In an embodiment, the dam portion 700 can be formed in such a manner that an inorganic solvent or an organic solvent (hereinafter, solvent) is injected between the first substrate 110 and the second substrate 120 through a single process and then cured. In this embodiment, a second injection hole 710 for injecting the solvent can be formed in the first substrate 110 and the adhesive layer 400. The second injection hole 710 can include a third opening H3 formed in the first substrate 110 and a fourth opening H4 overlapping the third opening H3 and formed in the adhesive layer 400.

In an embodiment, the solvent can be injected to fill the second injection hole 710. Accordingly, after the solvent is cured, the dam portion 700 can be formed to fill the third opening H3 and the fourth opening H4. Since the dam portion 700 completely fills the second injection hole 710, the light conversion layer 300 and the adhesive layer 400 interposed therein can be further shielded from the outside.

The optical path control device 2 as described above shields the adhesive layer 400 vulnerable to penetration of foreign substances from the outside through the sealing portion 600 and the dam portion 700, and the penetration path of the external foreign substances penetrate through the adhesive layer 400 is blocked, and as a result, the light conversion layer 300 provided inside the adhesive layer 400 is shielded from the external environment. Accordingly, the optical path control device 2 can prevent foreign substances from penetrating into the containing portion 320 of the light conversion layer 300 and prevent the dispersing liquid 321 of the containing portion 320 from volatilizing to the outside.

Figure 7:
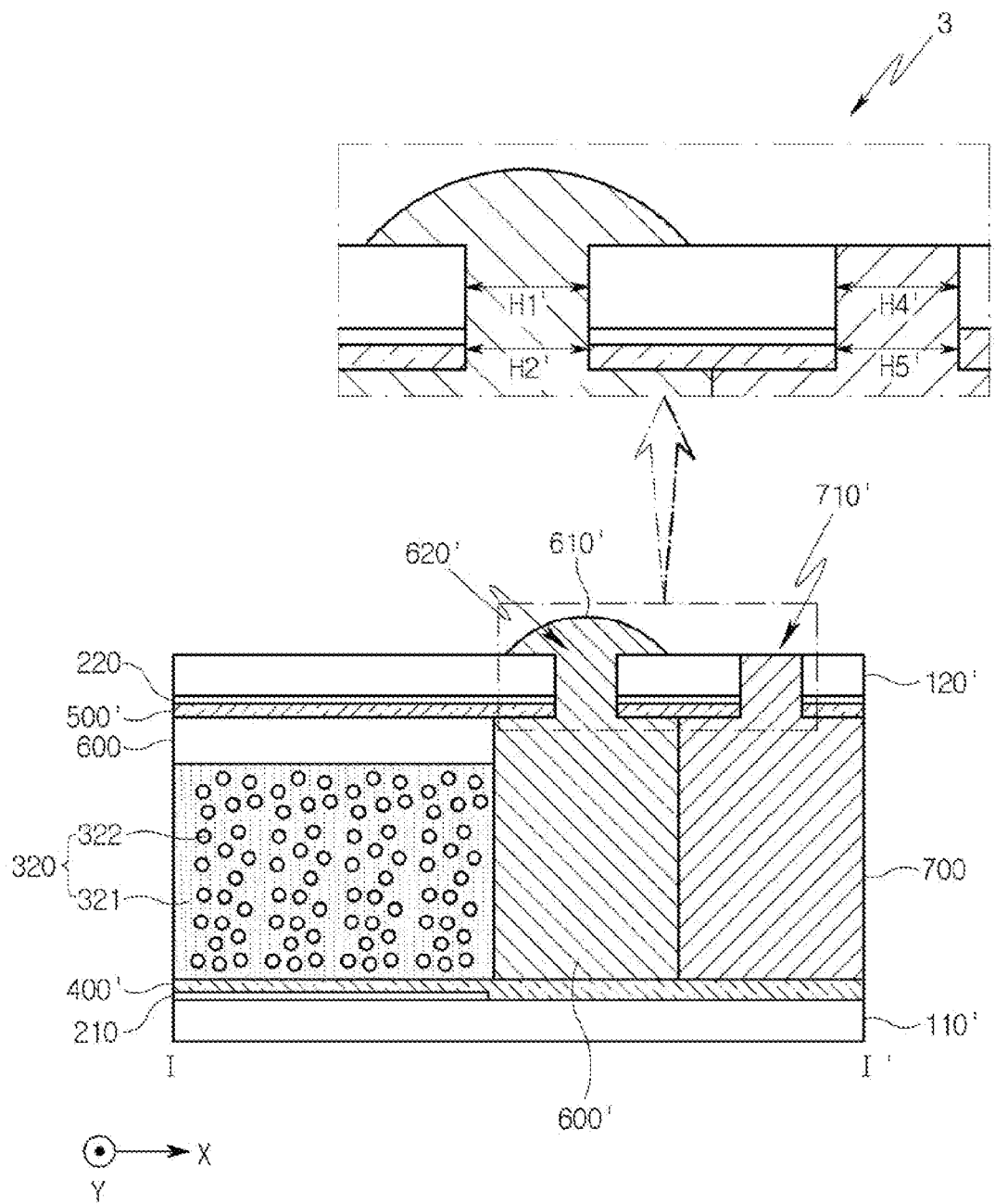
FIG. 7 is a schematic cross-sectional view of an optical path control device according to a second embodiment of the present invention.

FIG. 7 is a schematic cross-sectional view of an optical path control device according to a second embodiment. Specifically, FIG. 7 is a cross-sectional view taken along line I-I' of FIG. 4.

The embodiment shown in FIG. 7 is different from the embodiment described with reference to FIGS. 5 and 6 in that the injection holes 620' and 710' are provided in the second substrate 120'. Hereinafter, in describing the embodiment of FIG. 7, it will be mainly described with respect to the differences from the embodiment of FIGS. 5 and 6, and detailed description of the same components will be omitted or may be briefly discussed.

Referring to FIG. 7, an optical path control device 3 can include a first substrate 110', a second substrate 120', the first electrode 210, the second electrode 220, and the light conversion layer 300. In addition, an adhesive layer 400' can be disposed between the light conversion layer 300 and the first electrode 210, and a primer 500' can be further disposed between the light conversion layer 300 and the second electrode 220.

A sealing portion 600' can be disposed in an edge area of the first substrate 110'. The sealing portion 600' can be interposed between the first substrate 110' and the second substrate 120'. More specifically, the sealing portion 600' can be interposed between the adhesive layer 400' and the primer 500'.

In an embodiment, the sealing portion 600' can be formed in such a manner that the sealant is injected between the first substrate 110' and the second substrate 120' through a single process and then cured. A first injection hole 620' for injecting the sealant can be formed in the primer 500' of the second substrate 120'. The first injection hole 620' can include a first opening H1' formed in the second substrate 120' and a second opening H2' formed in the primer 500'.

In an embodiment, the sealant can be injected to fill the first injection hole 620'. Accordingly, after the sealant is cured, the sealing portion 600' can be formed to fill the first opening H1' and the second opening H2'. Since the sealing portion 600' completely fills the first injection hole 620', the light conversion layer 300 interposed therein can be shielded from the outside.

In an embodiment, the sealing portion 600' can include a protrusion 610' protruding upward at the first injection hole 620' and covering an upper surface of the second substrate 120' around the first injection hole 620'. Through the protrusion 610', the sealing portion 600' is in contact with the second substrate 120' in a larger area. i.e., not only with the inner surface of the first opening H1' formed in the second substrate 120', but also with the upper surface of the second substrate 120'. Adhesion between the second substrate 120' and the sealing portion 600' can be further improved through the protrusion 610', and the light conversion layer 300 interposed therein can be further shielded from the outside.

In an embodiment, a third opening H3' is formed in the adhesive layer 400'. For example, the third opening H3' can be formed to overlap the first injection hole 620'. In this embodiment, the sealing portion 600' is further formed to fill the third opening H3'. Accordingly, the adhesive layer 400' interposed therein can be shielded from the outside.

A dam portion 700' can be further disposed in an edge area of the first substrate 110'. The dam portion 700' can be interposed between the first substrate 110' and the second substrate 120'. More specifically, the dam portion 700' can be interposed between the adhesive layer 400' and the primer 500'.

In an embodiment, the dam portion 700' can be formed in such a manner that the solvent is injected between the first substrate 110' and the second substrate 120' through a single process and then cured. In this embodiment, a second injection hole 710' for injecting the solvent can be formed in the second substrate 120' and the primer 500'. The second injection hole 710' can include a fourth opening H4' formed in the second substrate 120' and a fifth opening H5' formed in the primer 500'.

In an embodiment, the solvent can be injected to fill the second injection hole 710'. Accordingly, after the solvent is cured, the dam portion 700' can be formed to fill the fourth opening H4' and the fifth opening H5'. Since the dam portion 700' completely fills the second injection hole 710', the light conversion layer 300 interposed therein can be further shielded from the outside.

In an embodiment, a sixth opening H6' is formed in the adhesive layer 400'. For example, the sixth opening H6' can be formed to overlap the second injection hole 710'. In this embodiment, the dam portion 700' is further formed to fill the sixth opening H6'. Accordingly, the adhesive layer 400' interposed therein can be further shielded from the outside.

In the embodiment illustrated with respect to FIGS. 5 and 6, an upper surface of the sealing portion 600 can be in contact with the primer 500 disposed thereon. Contrary thereto, in the embodiment shown in FIG. 7, the lower surface of the sealing portion 600' can be in contact with the first substrate 110'. In an embodiment, the sealant used for the sealing portion 600 can adhere better to the primer 500 having an adhesive force than the first substrate 110 formed of polyethylene terephthalate (PET) or the like. In such embodiments, the embodiment shown in FIGS. 5 and 6 in which the sealing portion 600 is injected from the lower portion can provide a higher shielding reliability by the sealing portion 600.

In the embodiment shown in FIG. 7, in order to improve adhesion between the first substrate 110' and the sealing portion 600', an adhesive or a primer can be additionally applied on the first substrate 110'. Here, the resistance at the time of applying a voltage to the first electrode 210 can be increased due to the adhesive or the primer. In order to prevent this problem, the adhesive or the primer can be selectively applied to an upper surface of the first substrate 110' exposed by the opening H3'.

Figure 8:
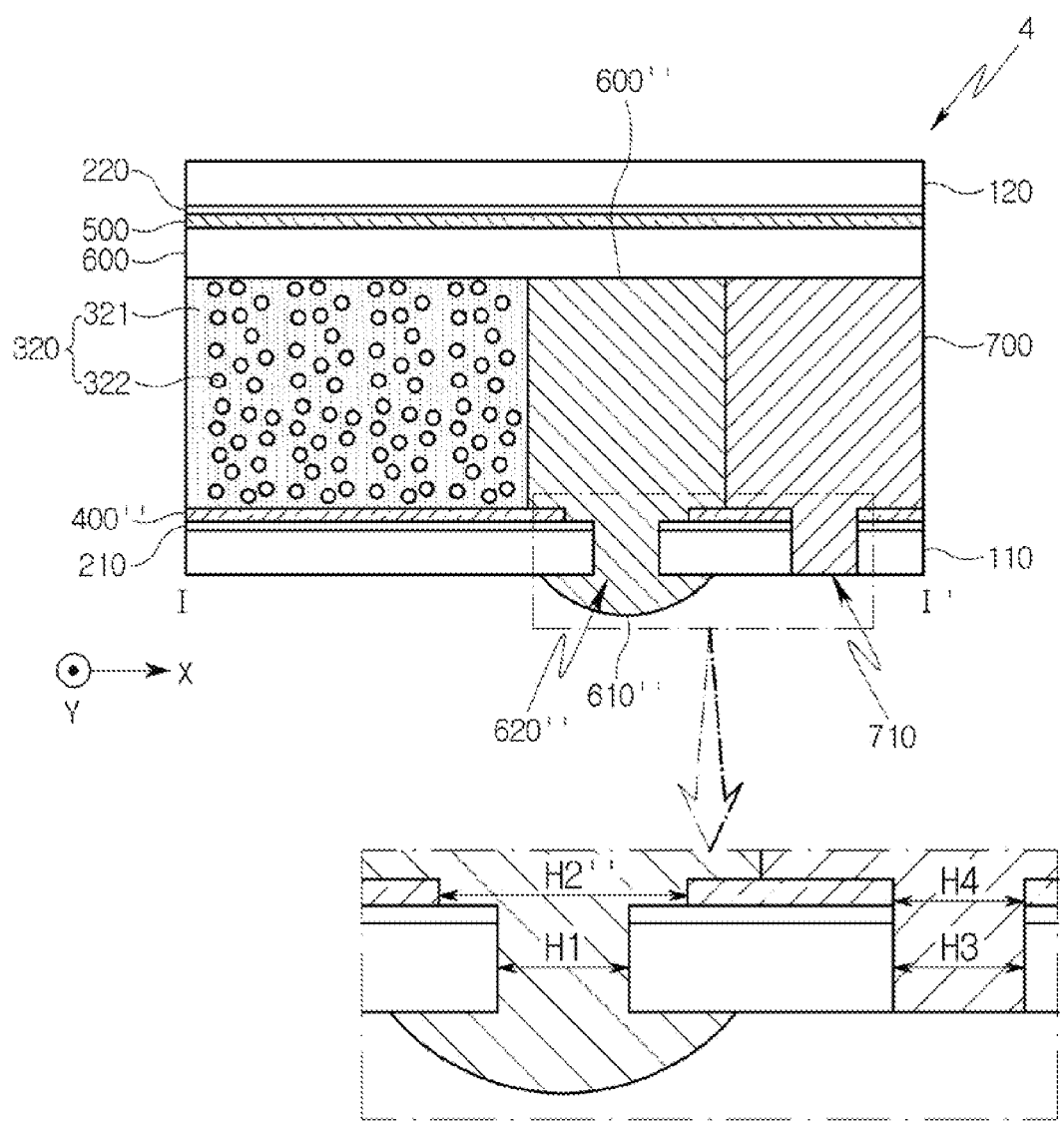
FIGS. 8 and 9 are schematic cross-sectional views of an optical path control device according to a third embodiment of the present invention.
Figure 9:
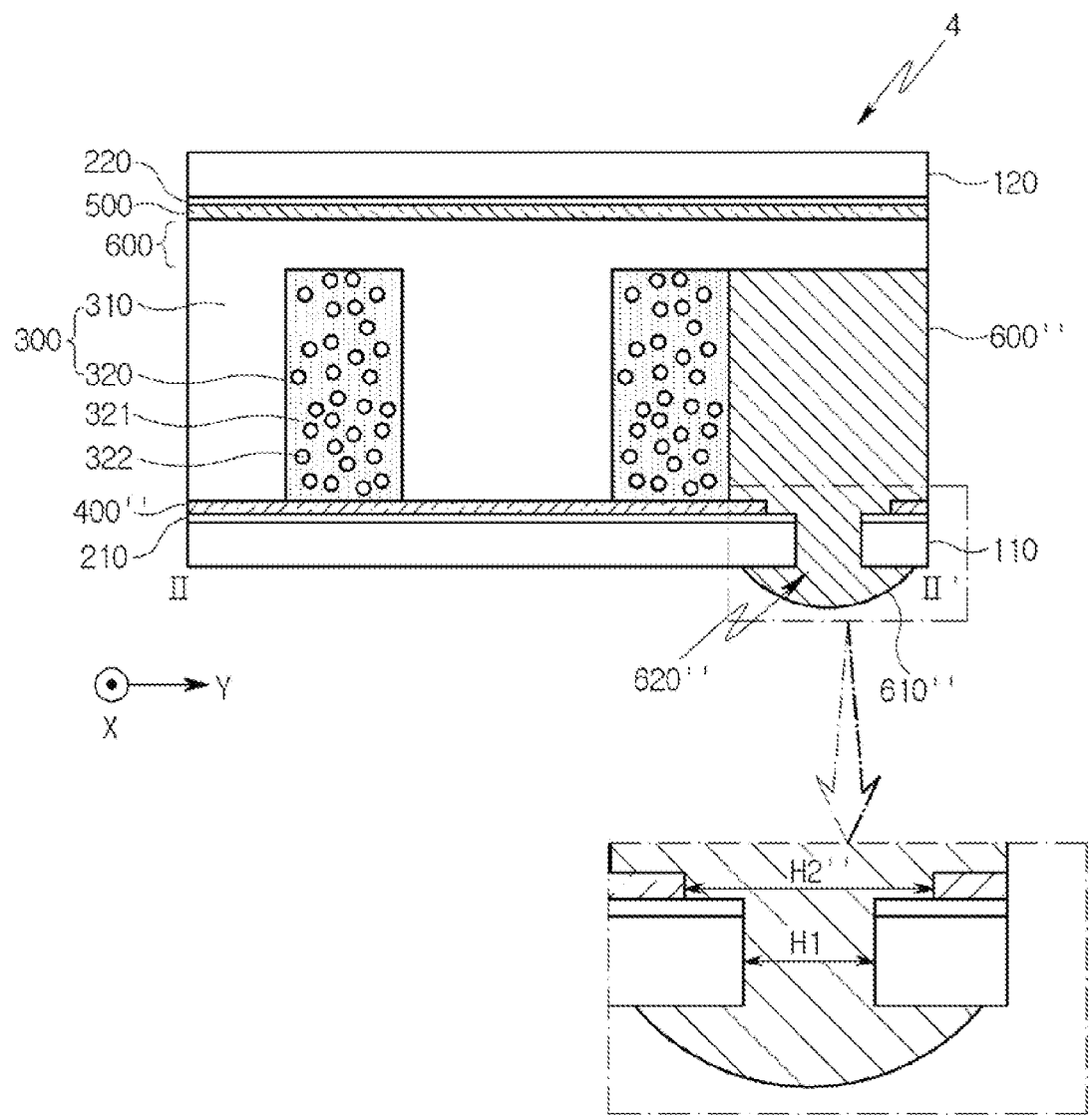

FIGS. 8 and 9 are schematic cross-sectional views of an optical path control device according to a third embodiment. Specifically, FIG. 8 is a cross-sectional view taken along line I-I' of FIG. 4, and FIG. 9 is a cross-sectional view taken along line II-II' of FIG. 4.

The embodiment shown in FIGS. 8 and 9 is different from the embodiment described with reference to FIGS. 5 and 6 in that a size of the second opening H2" formed in the adhesive layer 400" is larger than a size of the first opening H1 formed in the first substrate 110. Hereinafter, in describing the embodiment of FIGS. 8 and 9, it will be mainly described with respect to the differences from the embodiment of FIGS. 5 and 6, and detailed description of the same components will be omitted or may be briefly discussed.

Referring to FIGS. 8 and 9, an optical path control device 4 can include the first substrate 110, the second substrate 120, the first electrode 210, the second electrode 220, and the light conversion layer 300. In addition, an adhesive layer 400" can be disposed between the light conversion layer 300 and the first electrode 210, and the primer 500 can be further disposed between the light conversion layer 300 and the second electrode 220.

A sealing portion 600" can be disposed in the edge area of the first substrate 110. The sealing portion 600" can be interposed between the first substrate 110 and the second substrate 120. More specifically, the sealing portion 600" can be interposed between the adhesive layer 400" and the primer 500.

In an embodiment, the sealing portion 600" can be formed in such a manner that the sealant is injected between the first substrate 110 and the second substrate 120 through a single process and then cured. A first injection hole 620" for injecting the sealant can be formed in the adhesive layer 400" and the first substrate 110. The first injection hole 620" can include the first opening H1 formed in the first substrate 110 and a second opening H2" formed in the adhesive layer 400".

In the present embodiment, the second opening H2" formed in the adhesive layer 400" is formed to be larger than the first opening H1 formed in the first substrate 110. For example, the width (or diameter) of the second opening H2" is greater than the width (or diameter) of the first opening H1. In this structure, the second opening H2" is recessed more in the inner wall direction of the first injection hole 620" than the first opening H1. The first opening H1 is formed to overlap the second opening H2".

In this structure, the adhesive layer 400" becomes away from a surface of the first injection hole 620". Then, the problem of the first injection hole 620" being blocked by the residue of the adhesive layer 400" during the process can be improved.

The sealant can be injected to fill the first injection hole 620". Accordingly, after the sealant is cured, the sealing portion 600" can be formed to fill the first opening H1 and the second opening H2". Since the sealing portion 600" completely fills the first injection hole 620", the light conversion layer 300 and the adhesive layer 400 interposed therein can be shielded from the outside by the sealing portion 600".

In one embodiment, the sealing portion 600" can include a protrusion 610" protruding downward at the first injection hole 620" and covering the lower surface of the first substrate 110 around the first injection hole 620". As illustrated, the protrusion 610 can have an anchor shape having a thickness varying depending on a position, but the present embodiment is not limited thereto.

The dam portion 700 can be further disposed in the edge area of the first substrate 110. The dam portion 700 can be interposed between the first substrate 110 and the second substrate 120. More specifically, the dam portion 700 can be interposed between the adhesive layer 400 and the primer 500.

Hereinafter, a manufacturing method of the optical path control device 3 of the third embodiment shown in FIGS. 8 and 9 will be described in more detail.

FIGS. 10 to 28 are views illustrating a manufacturing method of an optical path control device according to an exemplary embodiment.

Figure 10:
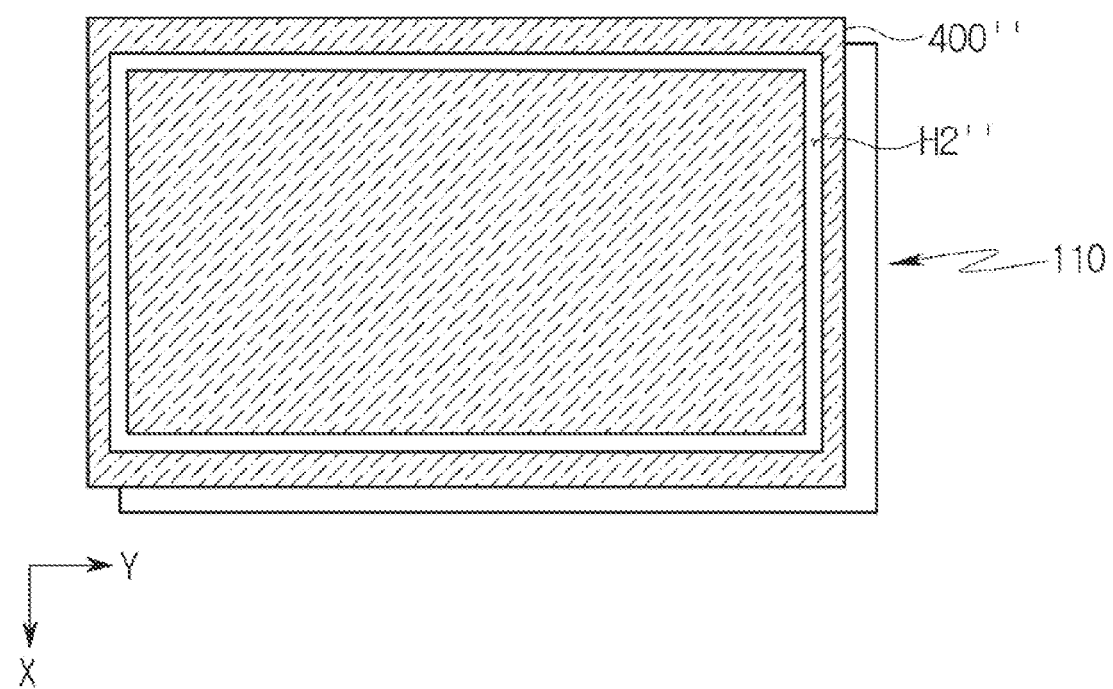
FIGS. 10 to 28 are views illustrating a manufacturing method of an optical path control device according to an exemplary embodiment of the present invention.
Figure 11:
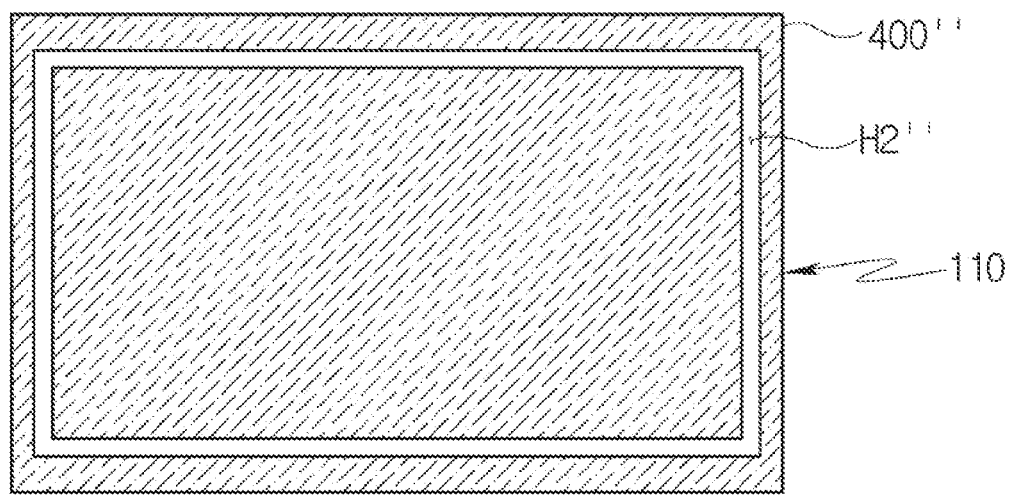

First, referring to FIGS. 10 and 11, the first electrode 210 is formed on the first substrate 110. In addition, the adhesive layer 400" is formed on the first substrate 110. The adhesive layer 400" can cover the entire surface of the first substrate 110.

The second opening H2" is formed in the adhesive layer 400" corresponding to the position where the sealing portion 600" is to be formed. For example, the sealing portion 600" can have a rectangular frame shape continuously extending along the edge of the first substrate 110. In this embodiment, the adhesive layer 400" can include the second opening H2" in the form of a rectangular frame continuously extending along the edge.

Figure 12:
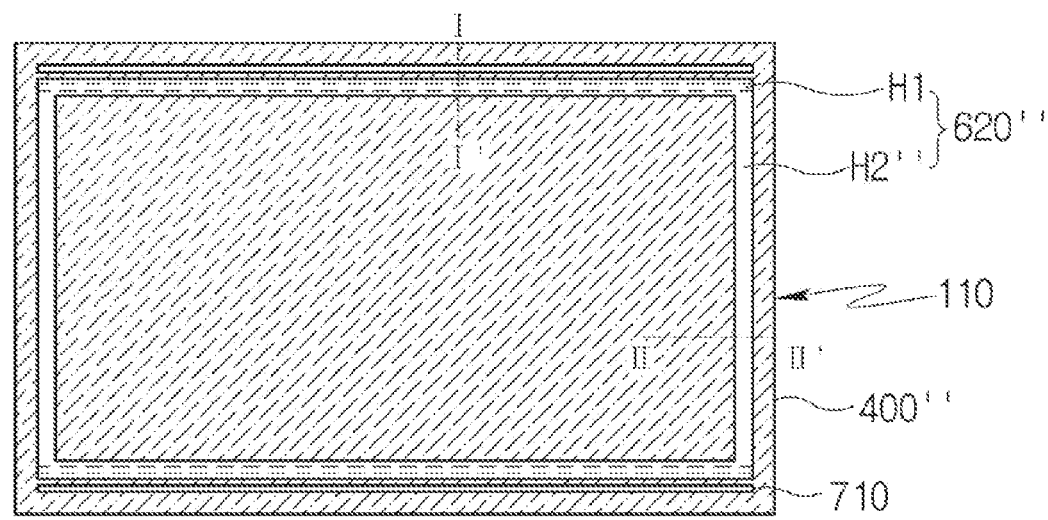

Referring to FIG. 12, thereafter, a process of punching the first injection hole 620" and the second injection hole 710 to form the sealing portion 600" and the dam portion 700 is performed. The punching process can be performed, for example, by irradiating a laser beam from a lower portion of the first substrate 110.

Figure 13:
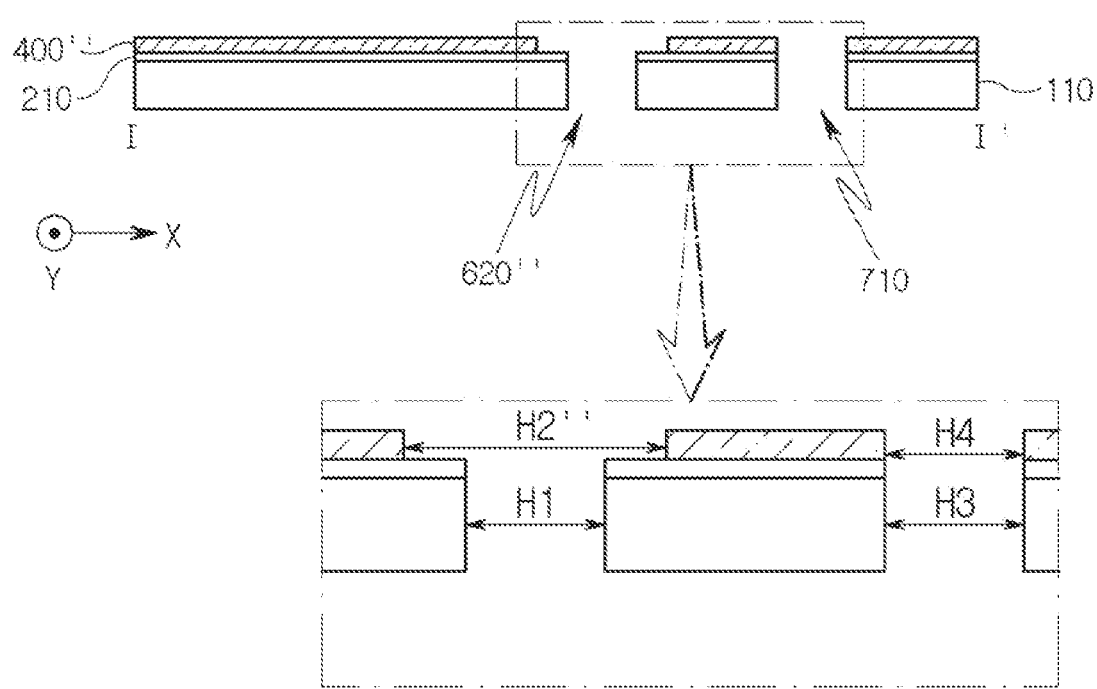
Figure 14:
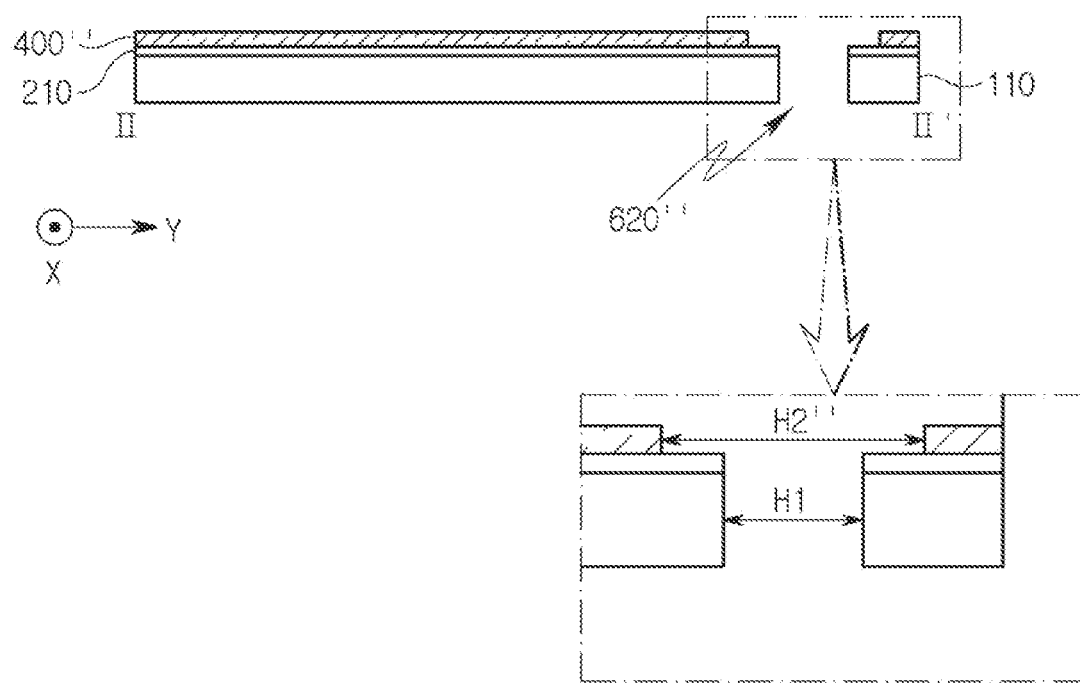

During the punching process, the laser beam can be irradiated to an area of the first substrate 110 overlapping the second opening H2". For example, the laser beam can be irradiated to upper and lower sides of the first substrate 110. Accordingly, as shown in FIGS. 13 and 14, the first opening H1 extending while overlapping with the second opening H2" is formed at the upper and lower sides of the first substrate 110. For example, the first opening H1 extends along an upper side edge and a lower side edge of the first substrate 100. The size (width) of the first opening H1 is smaller than that of the second opening H2". A first injection hole 620" is formed at the upper side and the lower side of the first substrate 110 by the first opening H1 and the second opening H2".

In addition, during the punching process, a laser beam can be irradiated to an area of the first substrate 110 on which the dam portion 700 is to be formed. For example, the dam portion 700 can be disposed at the upper side and the lower side of the first substrate 110. In this case, the dam portion 700 can have an extended bar shape. Accordingly, as shown in FIGS. 13 and 14, the third opening H3 is formed in the upper and lower sides of the first substrate 110, and the fourth opening H4 are formed at upper and lower layers of the adhesive layer 400". The second injection hole 710 is formed at the upper side and the lower side of the first substrate 110 by the third opening H3 and the fourth opening H4. For example, after the forming of the first injection hole 620", a second injection hole 710 penetrating the first substrate 110 and the adhesive layer 400" is formed at the outside of the first injection hole 620", wherein the second injection hole 710 extends along the upper side edge and the lower side edge of the first substrate 110.

Figure 15:
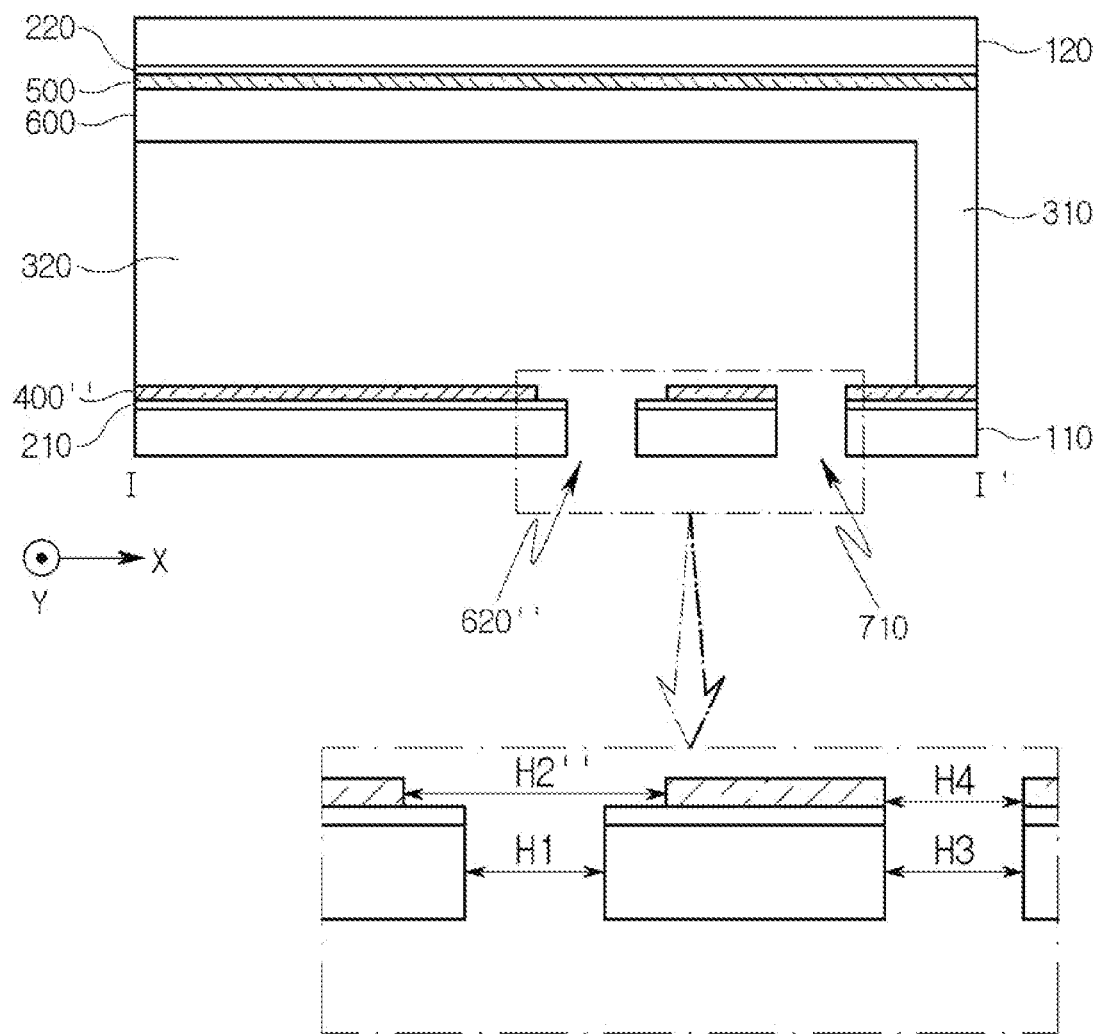

Thereafter, the second electrode 220 is formed on the second substrate 120, and the primer 500 is formed on the second substrate 120. By bonding the two substrates 110 and 120 in a state where the light conversion layer 300 in which the dispersing liquid 321 is not injected into the containing portion 320 is interposed between the first substrate 110 and the second substrate 120, the structure as shown in FIG. 15 can be formed.

After the bonding, at least one area of the containing portion 320 of the light conversion layer 300 can communicate with the first injection hole 620". For example, one end (upper side) of the containing portion 320 communicates with the first injection hole 620" extending at an upper side edge of the first substrate 110, and the other end (lower side) of the containing portion 320 can communicate with the first injection hole 620" extending at a lower side edge of the first substrate 110.

Thereafter, a sealing process of the upper/lower sides of the optical path control device 4 can be performed.

Figure 16:
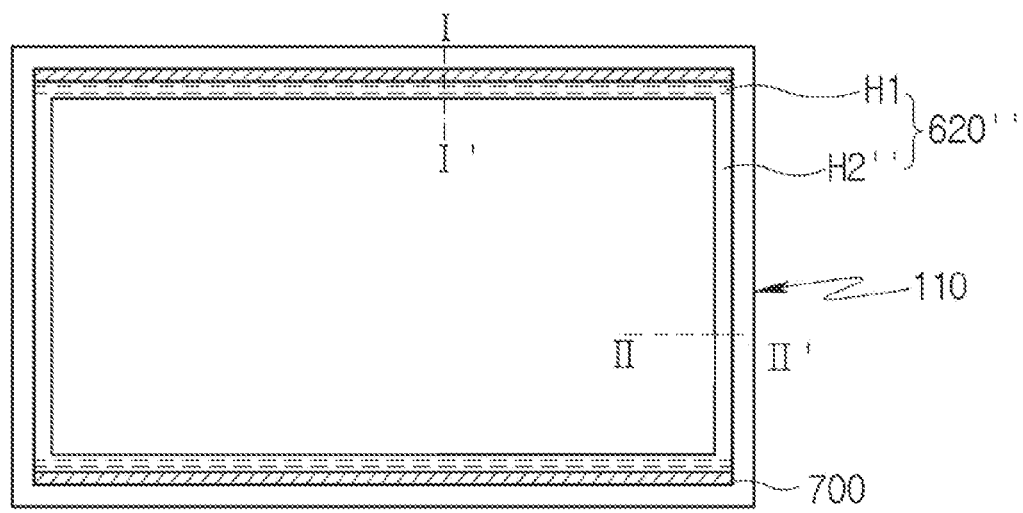
Figure 17:
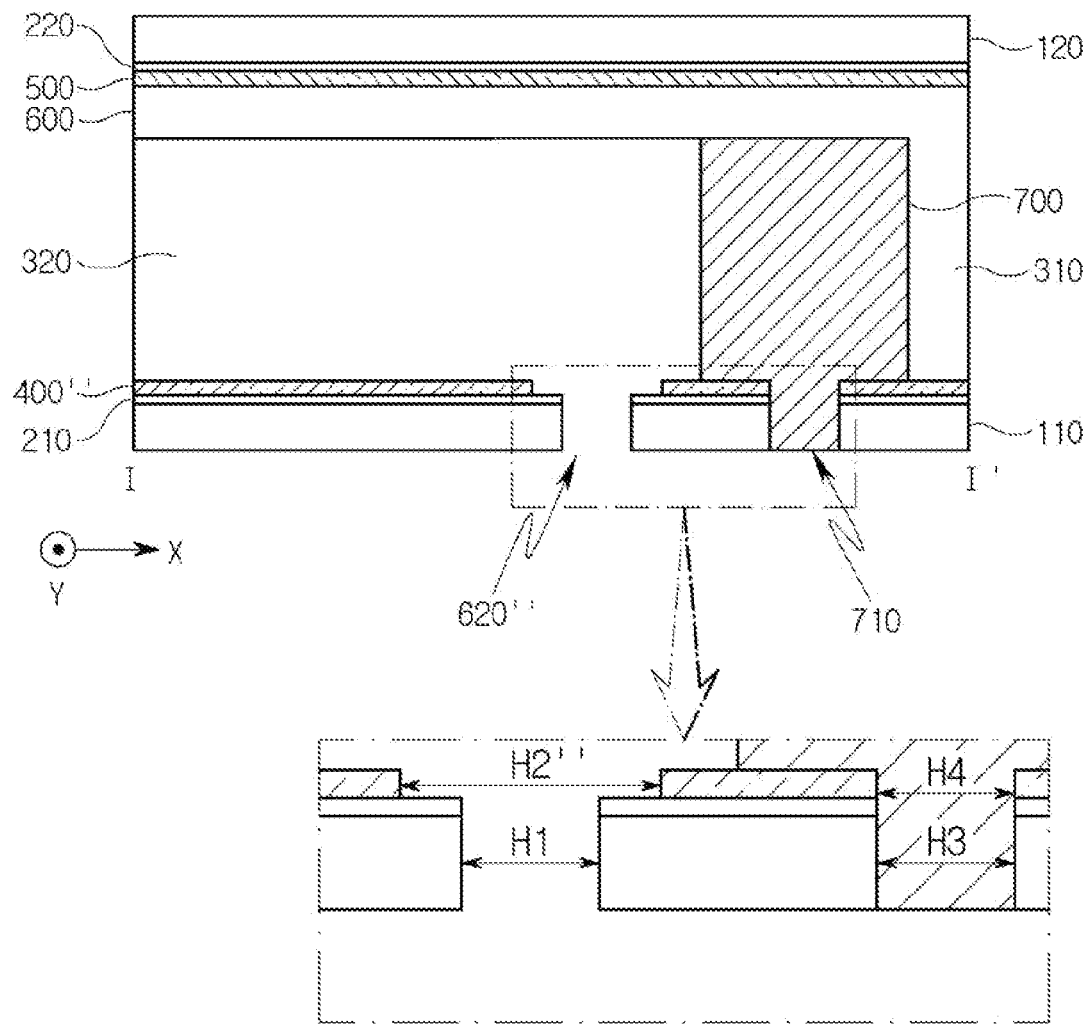

Referring to FIGS. 16 and 17, the dam portion 700 is formed. The dam portion 700 can be formed in a such manner that the solvent for forming the dam portion 700 is injected through the second injection hole 710 and then cured. The solvent can be injected to fill the second injection hole 710. Accordingly, after the solvent is cured, the dam portion 700 can be formed to fill the third opening H3 and the fourth opening H4. The dam portion 700 can be formed in a bar shape extending at the upper and lower sides of the first substrate 110 along the second injection hole 710.

Figure 18:
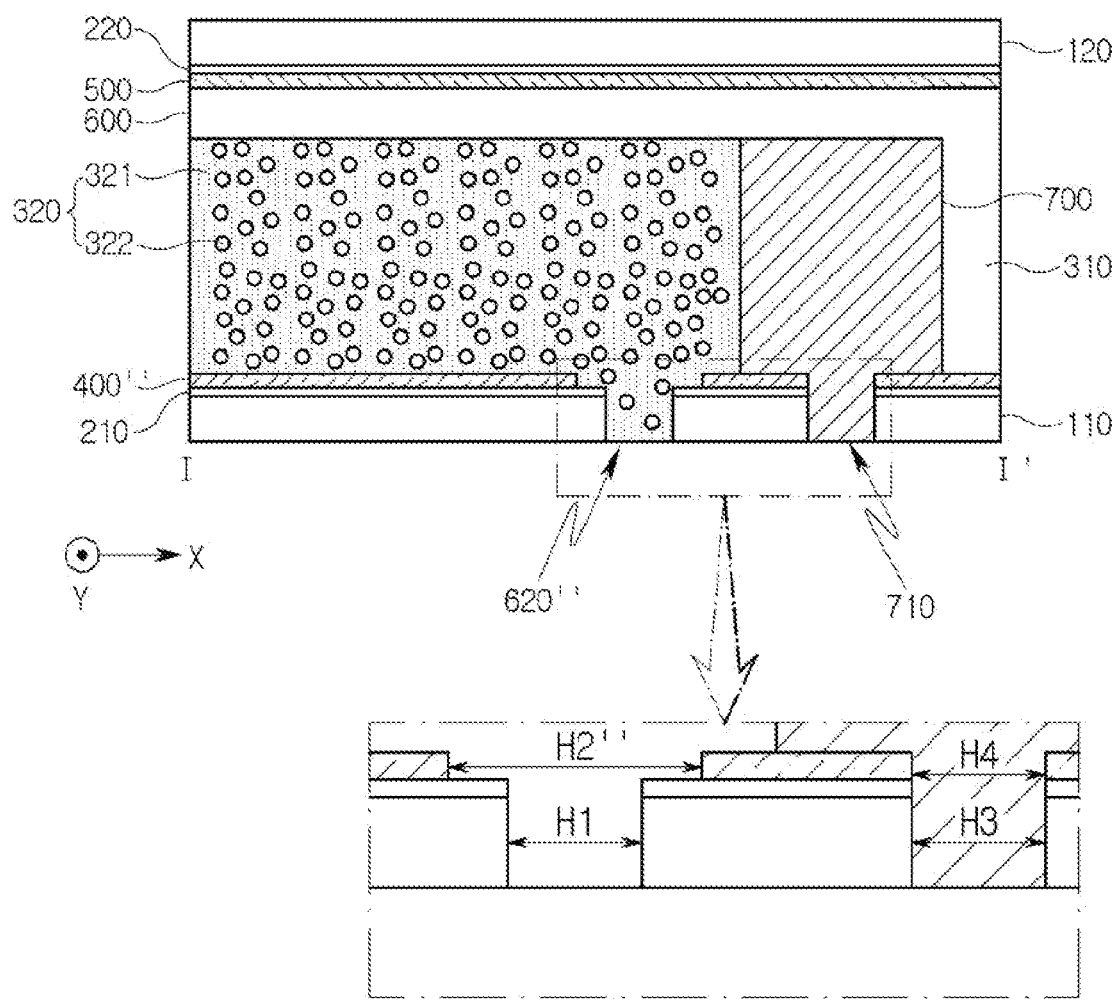
Figure 19:
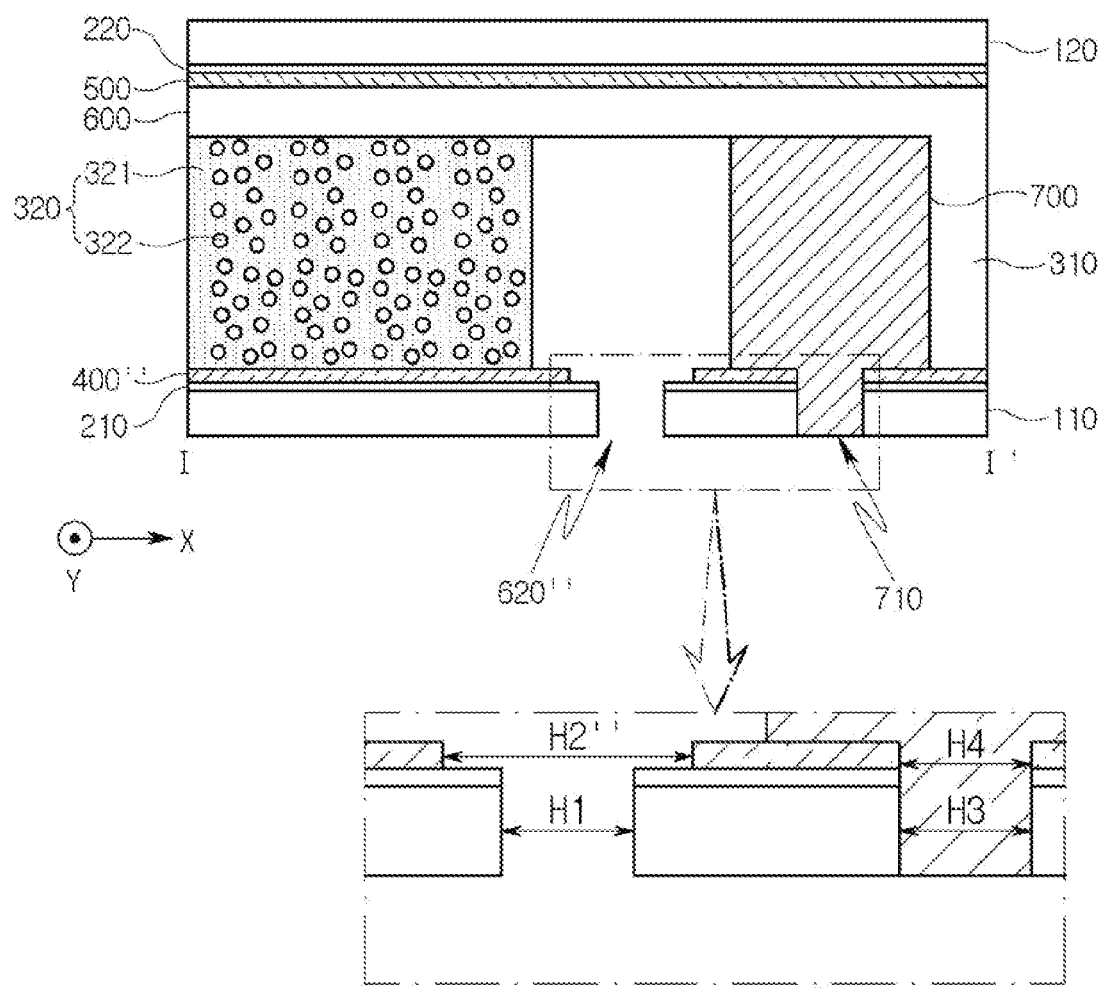

Referring to FIG. 18, the dispersing liquid 321 including suspended particles 322 is injected into the light conversion layer 300. The dispersing liquid 321 can be injected in an area of the first injection hole 620" that is in communication with the containing portion 320. For example, the dispersing liquid 321 can be injected from the upper side-first injection port 620", which communicates with one side of the containing portion 320. The remaining amount after filling the containing portion 320 can be discharged to the lower side-first injection hole 620" communicating with the other side of the containing portion 320. Thereafter, the dispersing liquid 321 injected into the first injection hole 620" can be removed, thereby forming the structure as shown in FIG. 19.

Figure 20:
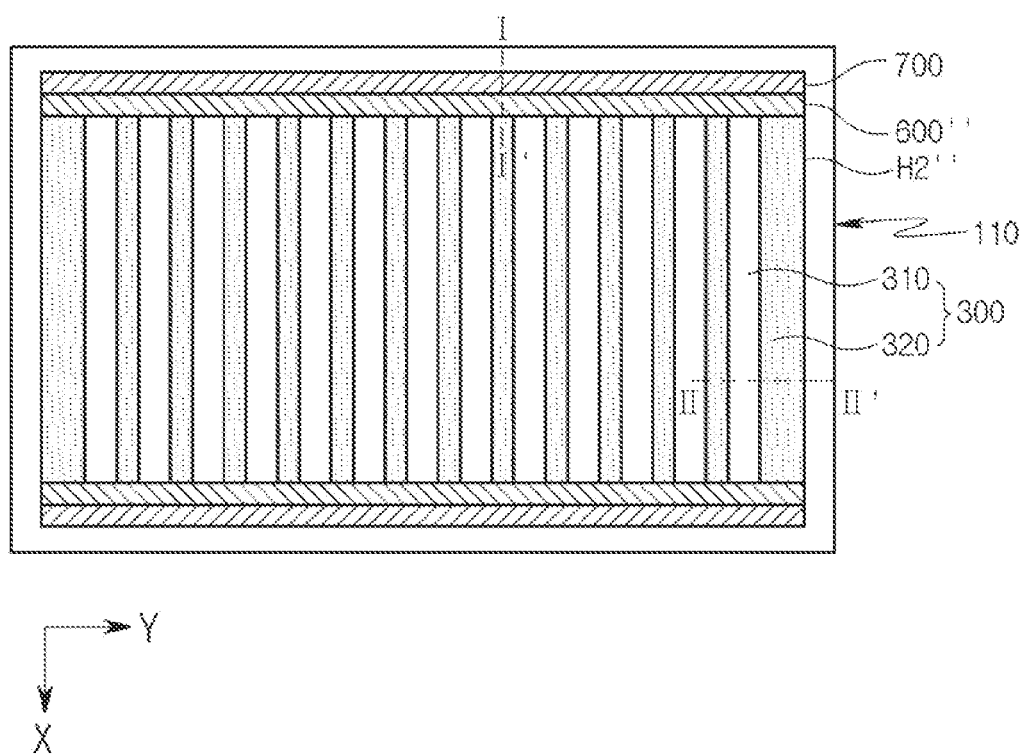
Figure 21:
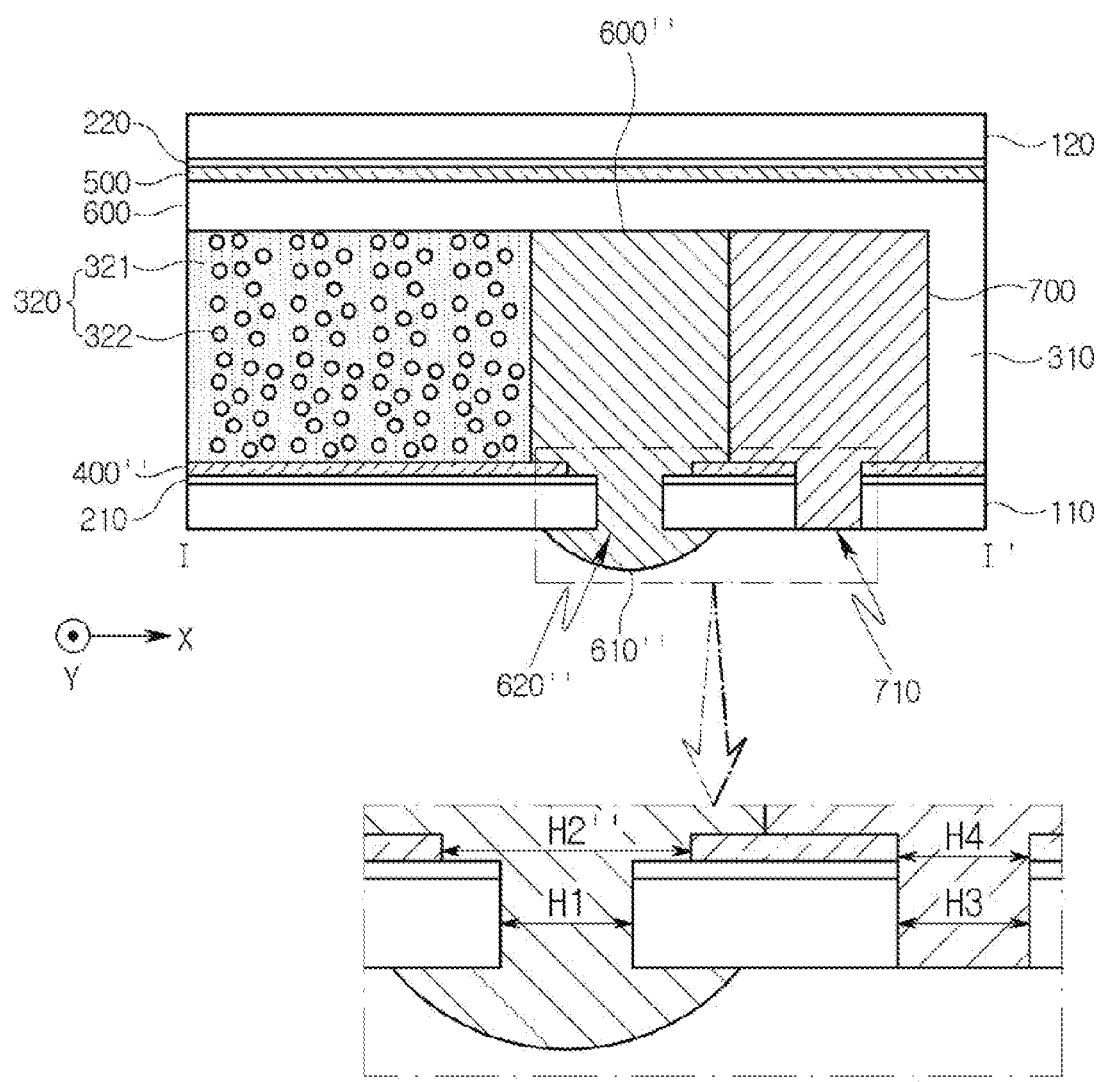

Referring to FIGS. 20 and 21, the sealing portion 600" is formed in such a manner that the sealant is injected into the first injection hole 620" disposed at the upper and lower sides and then cured. The sealing portion 600" can be formed in a bar shape extending at the upper side and the lower side of the first substrate 110 along the first injection hole 620".

In one embodiment, the sealant can be further injected to an outside of the first injection hole 620". Accordingly, after the curing, the protrusion 610" protruding in the first injection hole 620" and covering the lower surface of the first substrate 110 around the first injection hole 620" can be formed.

Thereafter, a sealing process of the left/right sides of the optical path control device 4 can be performed.

Figure 22:
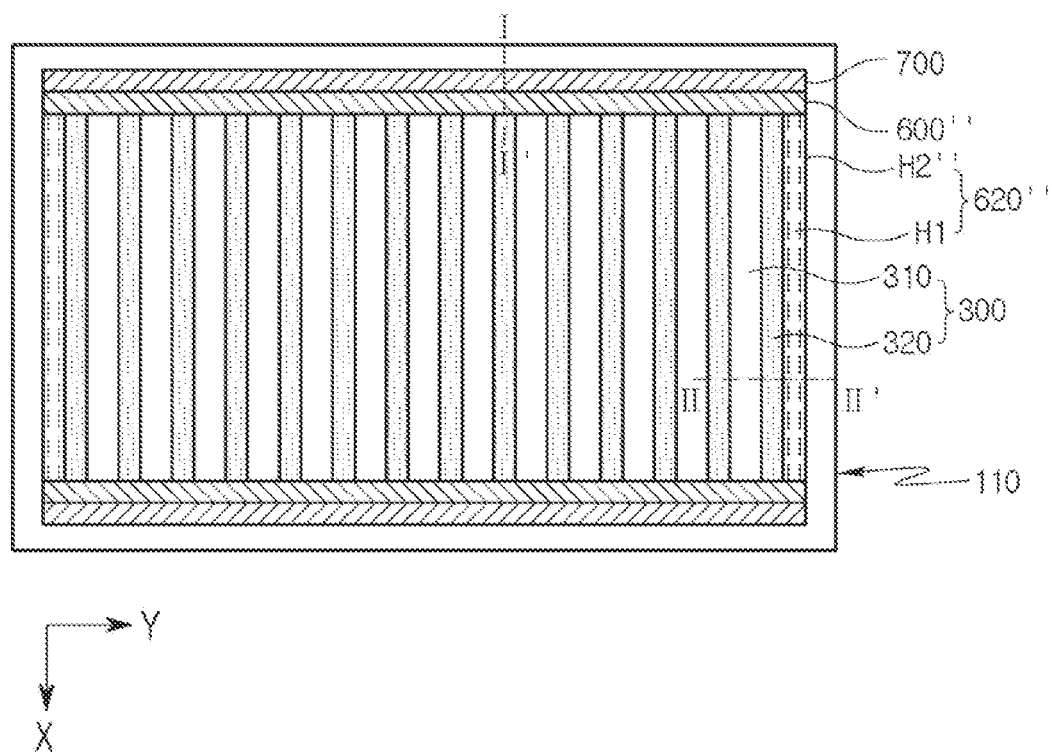
Figure 23:
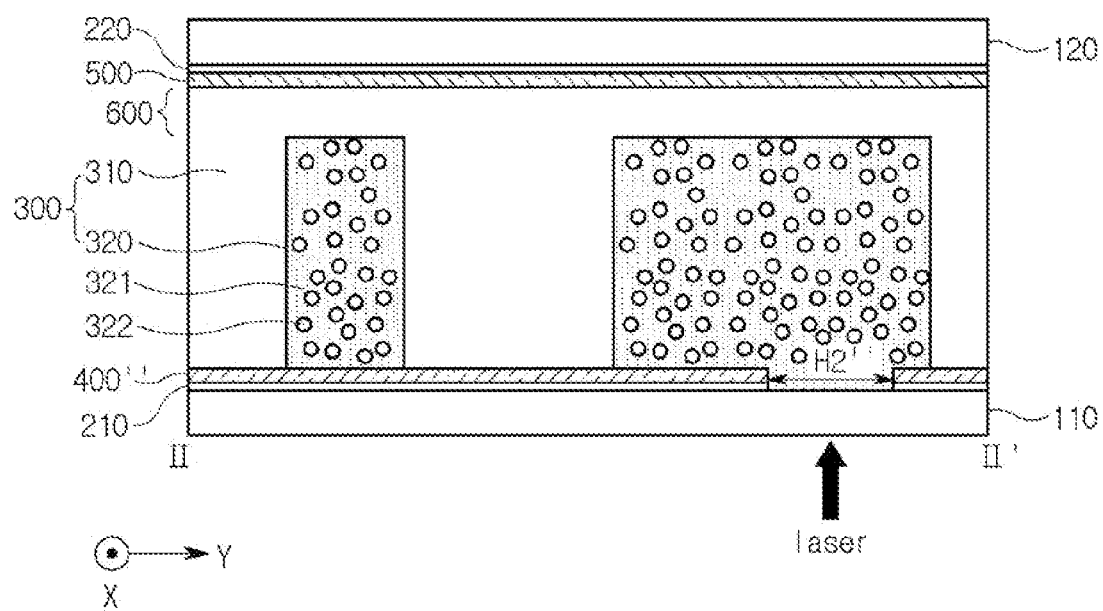
Figure 24:
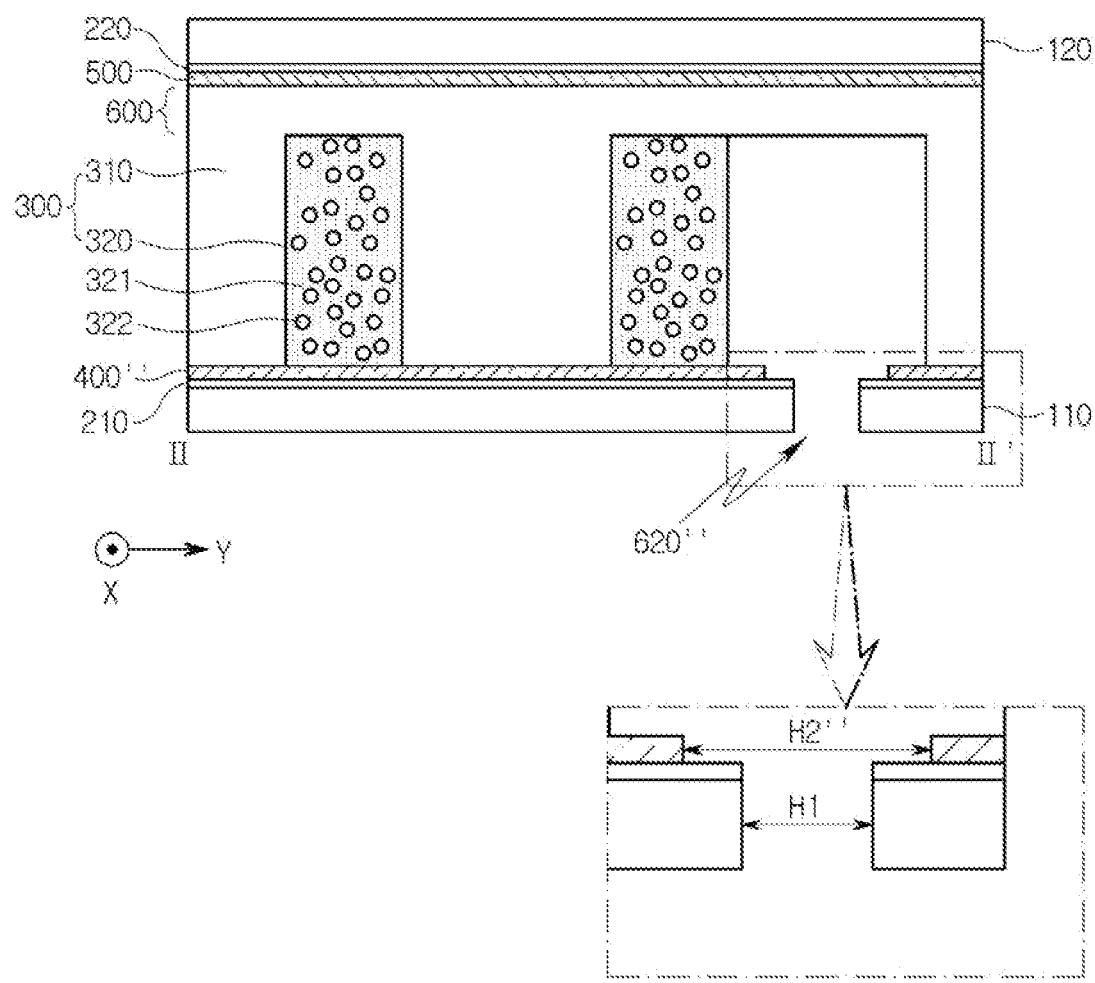

Referring to FIGS. 22 and 23, to further form the first injection hole 620", a process of punching the injection holes 620" is performed. During the punching process, a laser beam can be irradiated to an area of the first substrate 110 overlapping the second opening H2". For example, the laser beam can be irradiated to the left and right sides of the first substrate 110. Accordingly, the first opening H1 extending while overlapping with the second opening H2" is formed at the left and right sides of the first substrate 110. The size (width) of the first opening H1 is formed to be smaller than that of the second opening H2". By removing the dispersing liquid 321 injected into the second opening H2" and the light conversion layer 300 from the punched area, as shown in FIG. 24, the first inject hole 620" including the first opening H1 and the second opening H2" can be further formed.

Figure 25:
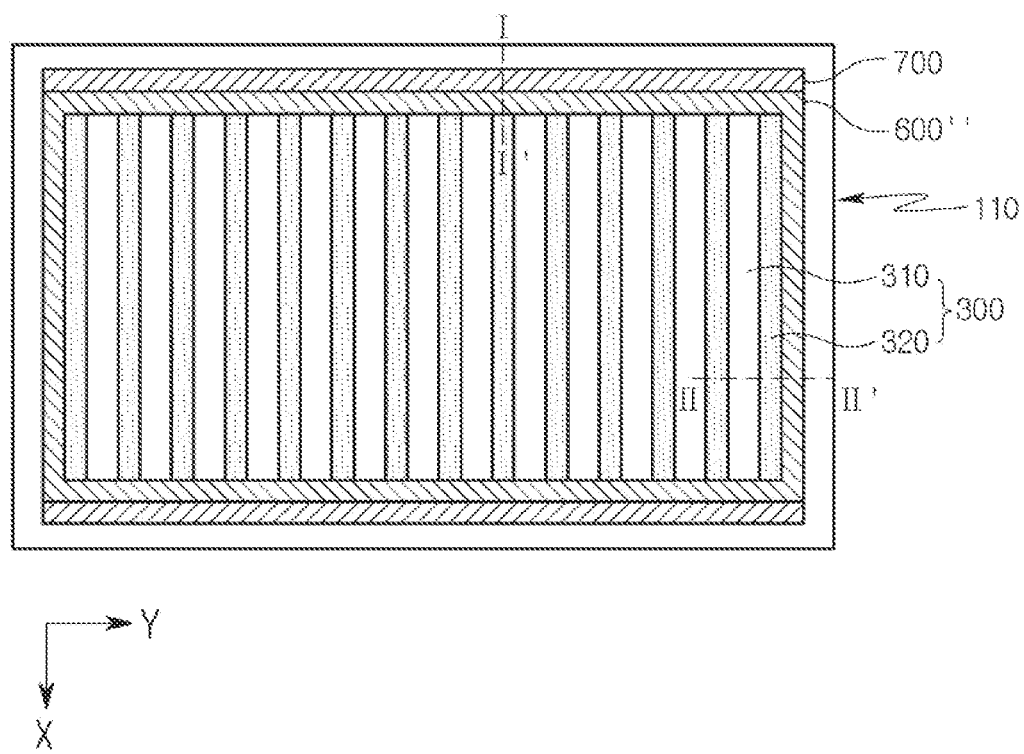
Figure 26:
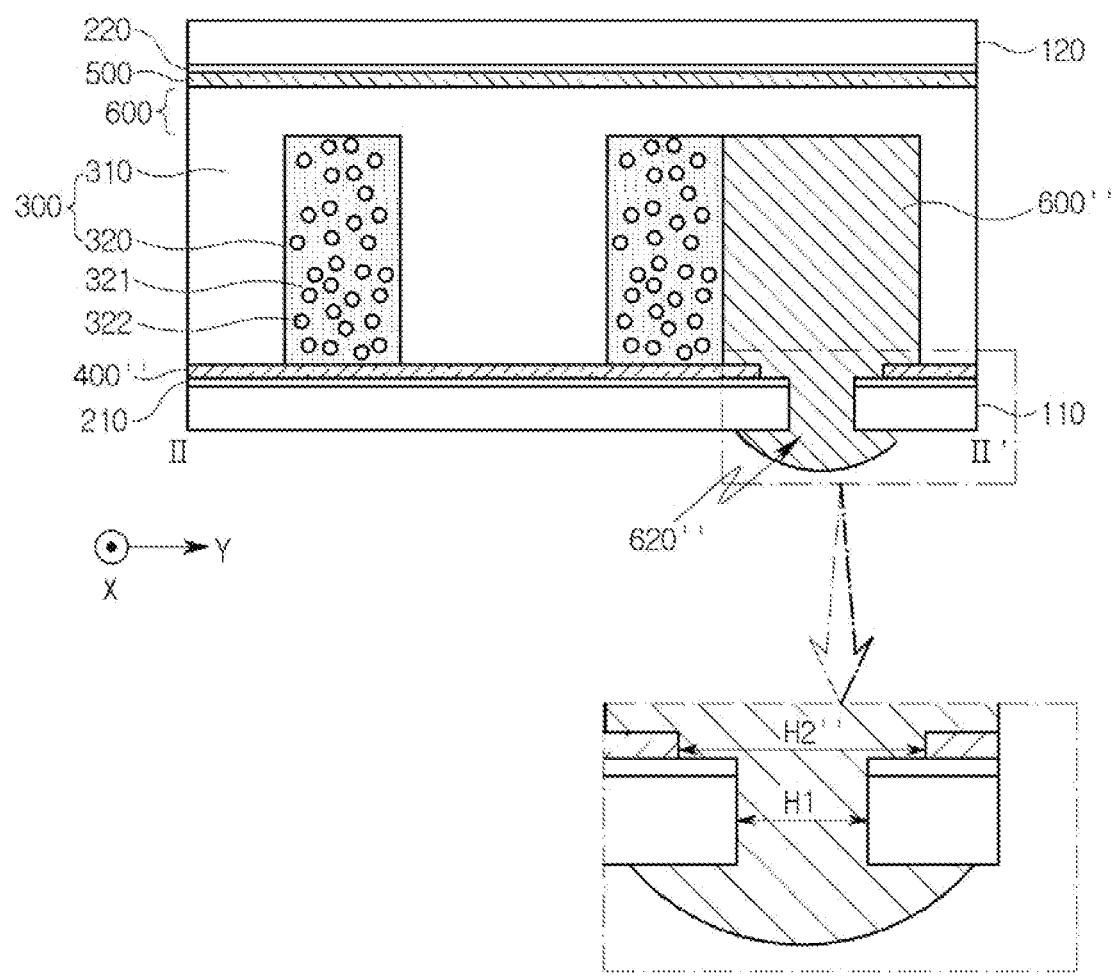

Thereafter, as shown in FIGS. 25 and 26, the sealing portion 600" is further formed by injecting the sealant through the first injection hole 620".

Figure 27:
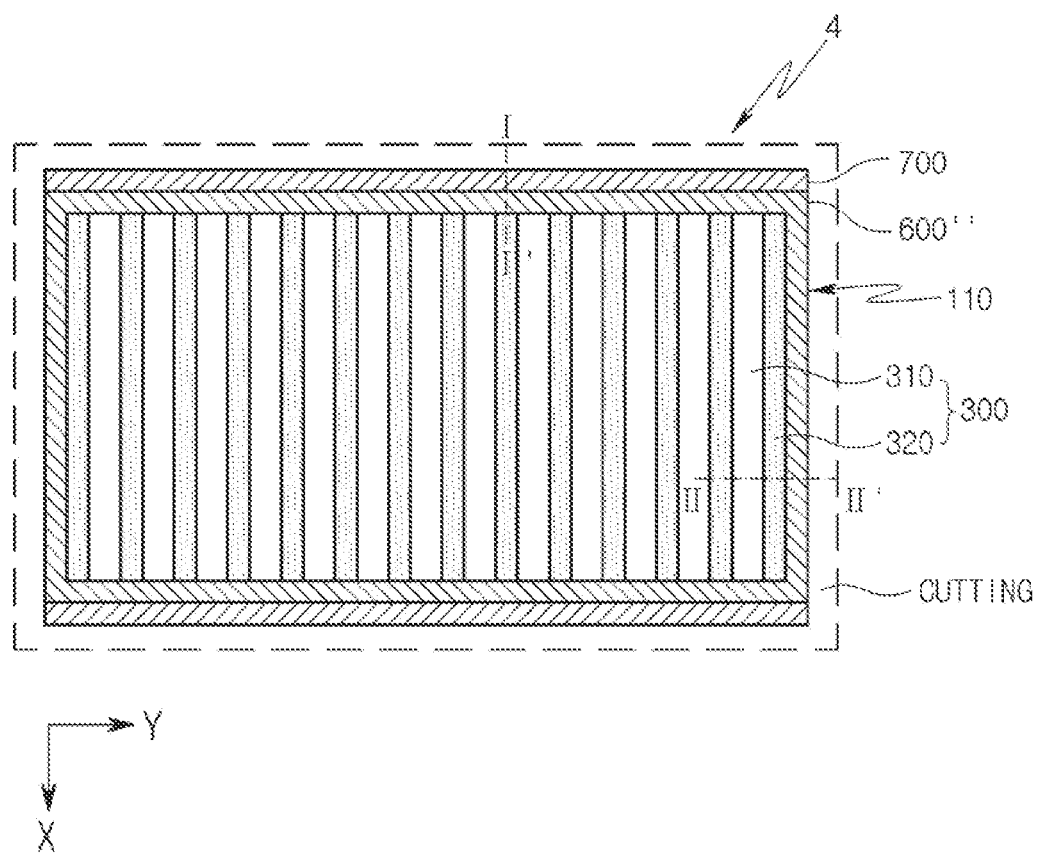
Figure 28:
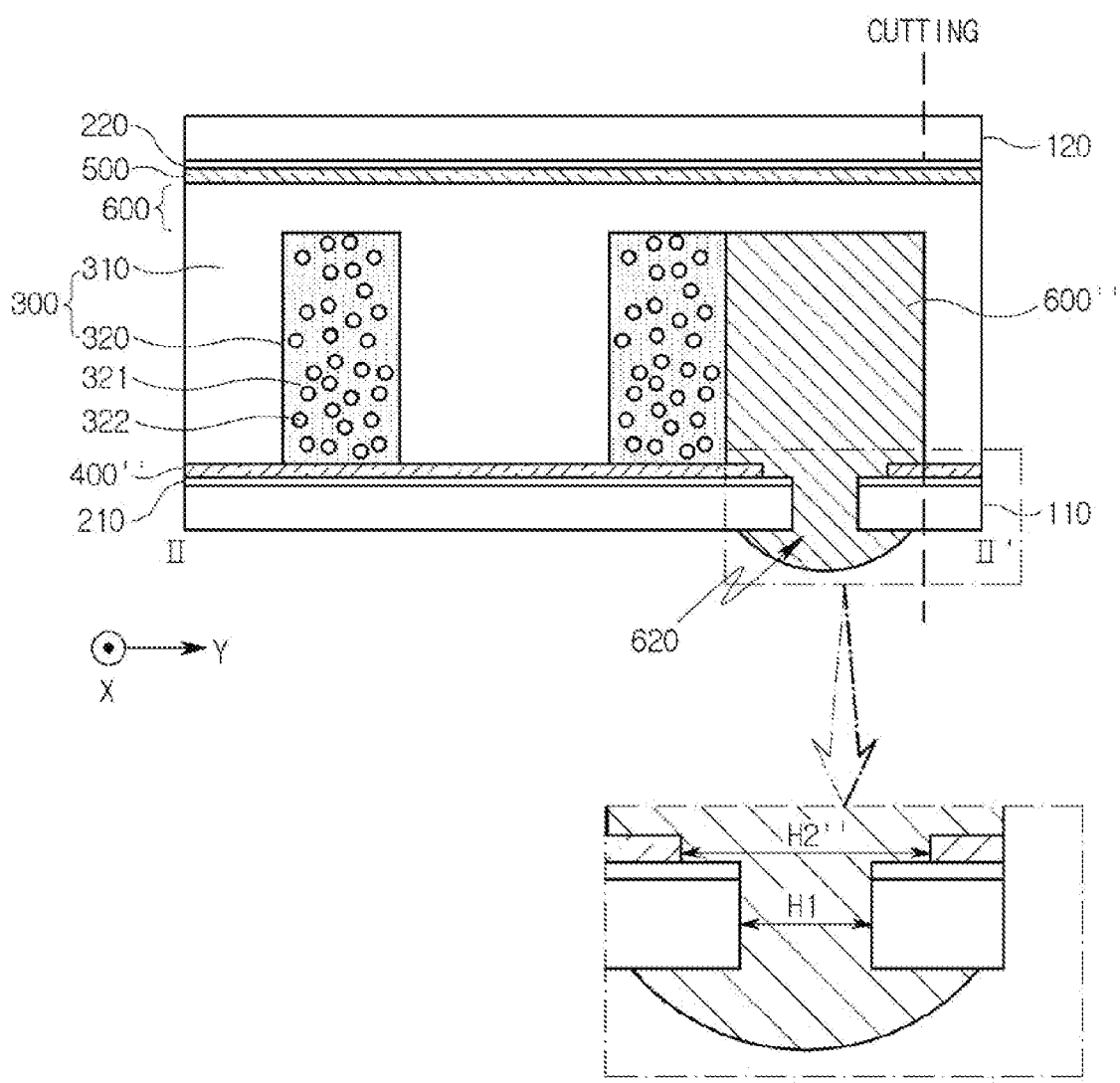

In addition, as shown in FIGS. 27 and 28, the edge area of the structure formed as such is cut, and thus the optical path control device 4 is finally completed. For example, the first substrate 110 and the second substrate 120 outside the sealing portion 600" and the dam portion 700 are cut to form the optical path control device 4. As shown in FIG. 27, the optical path control device 4 can be formed by cutting the upper, lower, left, and right edge areas.

The optical path control device and the manufacturing method of the same according to the embodiments can prevent foreign substances from being introduced into the optical path control device under a high temperature and high humidity environment, thereby improving reliability thereof.

The optical path control device and the manufacturing method of the same according to the embodiments can shield the internal light conversion layer from the outside, thereby preventing light leakage or stain defects caused by volatilization of the solvent of the light conversion layer.

The optical path control device and the manufacturing method of the same according to the embodiments can reduce manufacturing cost and simplify the manufacturing processes.

While embodiments of the present invention have been described with reference to the attached drawings, it would be understood by those of ordinary skill in the art that the technical configuration of the present invention can be implemented in other detailed forms without changing the technical spirit or the essential features of the present invention. Thus, it should be noted that the above-described embodiments are provided as examples and should not be interpreted as limiting. Moreover, the scope of the present invention should be defined by the following claims rather than the detailed description provided above. Furthermore, the meanings and scope of the claims and all changes or modified forms derived from their equivalents should be construed as falling within the scope of the present invention.

What is claimed is:

1. An optical path control device comprising:
   a first substrate having a first electrode disposed thereon;
   a second substrate disposed on the first substrate and having a second electrode disposed thereon;
   a light conversion layer disposed between the first substrate and the second substrate, and including a partition portion and a containing portion having suspended particles, wherein the partition portion and the containing portion are alternately disposed;
   an adhesive layer disposed between the first substrate and the light conversion layer; and
   a sealing portion disposed between the first substrate and the second substrate and surrounding the light conversion layer,
   wherein the sealing portion is disposed to fill a first injection hole disposed in the first substrate and the adhesive layer, and
   wherein the sealing portion comprises a protrusion that protrudes downward at the first injection hole and covers a lower surface of the first substrate around the first injection hole.

2. The optical path control device of claim 1, further comprising:
   a dam portion disposed between the first substrate and the second substrate and disposed at an outside of the sealing portion.

3. The optical path control device of claim 2, wherein the first injection hole comprises:
   a first opening disposed in the first substrate; and
   a second opening disposed in the adhesive layer to overlap the first opening, and
   wherein the sealing portion is disposed to fill the first opening and the second opening.

4. The optical path control device of claim 3, wherein the second opening is disposed to have a larger width than the first opening.

5. The optical path control device of claim 3, wherein the dam portion is disposed to fill a second injection hole disposed in the first substrate and the adhesive layer.

6. The optical path control device of claim 3, wherein the first injection hole communicates with the containing portion.

7. The optical path control device of claim 2, wherein the dam portion is in direct contact with the sealing portion.

8. The optical path control device of claim 1, wherein the protrusion has an anchor shape.

9. The optical path control device of claim 8, wherein the adhesive layer is shielded from an outside by the first substrate and the sealing portion.

* * * * *